(12) United States Patent
Nakajima et al.

(10) Patent No.: US 6,437,810 B1
(45) Date of Patent: Aug. 20, 2002

(54) SHELL EXTENSIONS FOR AN OPERATING SYSTEM

(75) Inventors: Satoshi Nakajima; George H. Pitt, III, both of Redmond; Joseph D. Belfiore, Seattle; Christopher J. Guzak, Kirkland; Chee H. Chew, Remond, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/704,627

(22) Filed: Nov. 2, 2000

Related U.S. Application Data

(63) Continuation of application No. 09/392,344, filed on Sep. 8, 1999, now Pat. No. 6,160,550, which is a division of application No. 09/179,240, filed on Oct. 26, 1998, now Pat. No. 6,008,806, which is a continuation of application No. 08/355,410, filed on Dec. 13, 1994, now Pat. No. 5,831,606.

(51) Int. Cl.[7] ................................................. G09G 5/00
(52) U.S. Cl. ..................... 345/804; 345/762; 345/810; 345/841; 345/765; 713/100; 717/11
(58) Field of Search ................................. 345/738, 744, 345/745, 762, 764, 769, 788, 804, 810, 835, 841, 843, 846, 866; 707/103, 200; 709/107, 315, 323, 330; 713/1, 2, 100; 717/11

(56) References Cited

U.S. PATENT DOCUMENTS

| | | | |
|---|---|---|---|
| 5,504,892 A | 4/1996 | Atsatt et al. | 707/103 R |
| 5,561,799 A | 10/1996 | Khalidi et al. | 707/200 |
| 5,572,709 A | 11/1996 | Fowler et al. | 703/27 |
| 5,581,760 A | 12/1996 | Atkinson et al. | 717/2 |
| 5,598,524 A | 1/1997 | Johnston, Jr. et al. | 345/769 |
| 5,615,400 A | 3/1997 | Cowsar et al. | 709/332 |
| 5,790,857 A | * 8/1998 | Clifford et al. | 717/3 |

* cited by examiner

*Primary Examiner*—Ba Huynh
(74) *Attorney, Agent, or Firm*—Christensen O'Connor Johnson Kindness PLLC

(57) ABSTRACT

An operating system provides extensions through which application developers may extend the capabilities of a shell of the operating system. For example, application developers may add menu items to context menus for objects that are visible within an integrated system name space. In addition, developers may add property sheet pages for such objects. Application developers also have the option of providing per-instance icons for each instance of an object. Application developers may provide data object extension handlers for customizing data sources on a per-object class basis and may provide drop target extension handlers on a per-object class basis to customize drop target behavior. Developers may additionally provide copy-hook handlers to regulate file system operations on objects. Developers may also extend the functionality provided by the shell of the operating system by adding their own custom name spaces to the integrated system name space. The mechanism provided by the operating system to add such a name space is polymorphic and transparent to users.

8 Claims, 10 Drawing Sheets

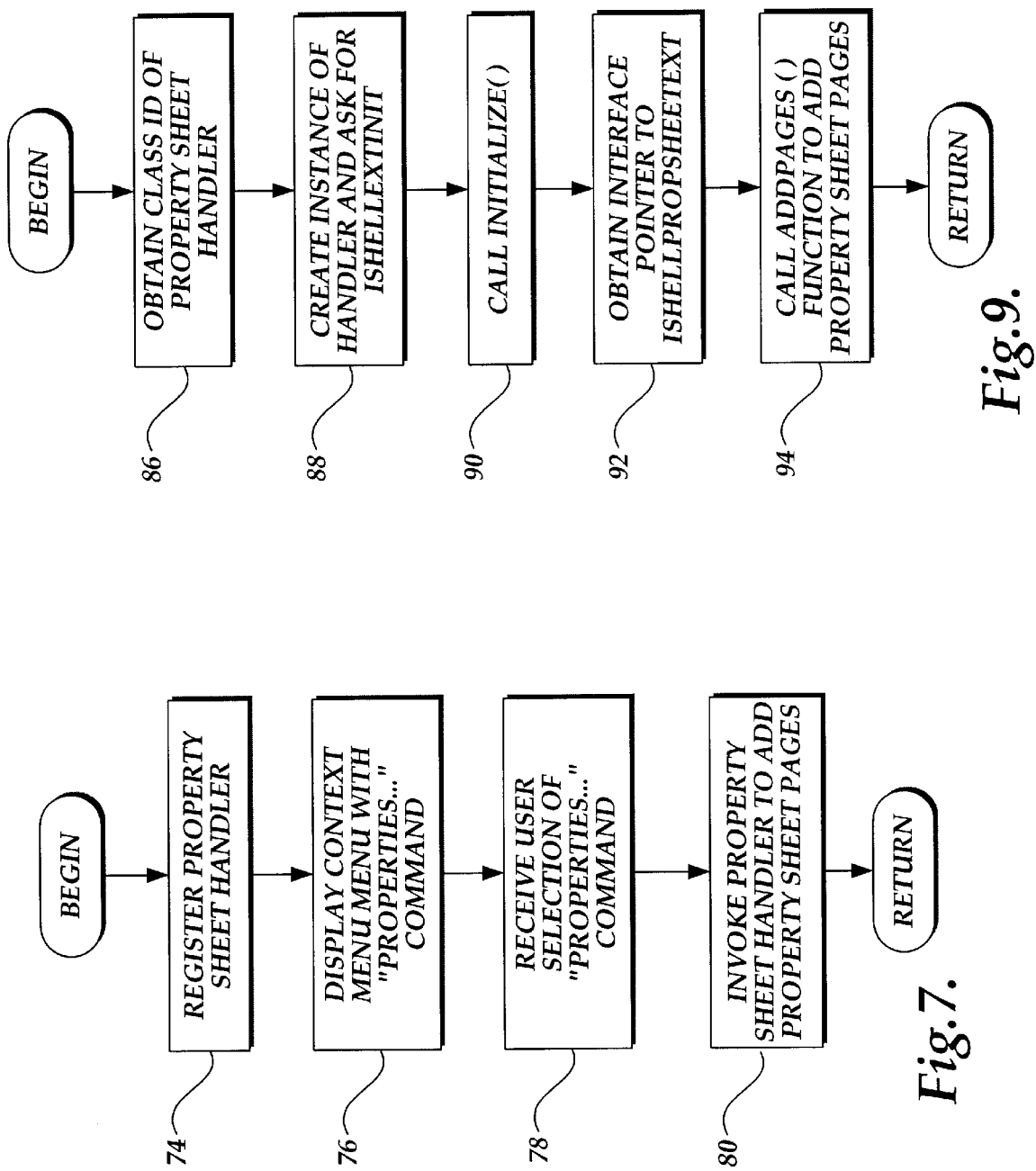

SHELL EXTENSIONS FOR AN OPERATING SYSTEM

CROSS-REFERENCE TO RELATED INVENTIONS

This is a continuation of prior application Ser. No. 09/392,344, filed Sept. 8, 1999, U.S. Pat. No. 6,160,550 which is a divisional of prior application Ser. No. 09/179,240, filed Oct. 26, 1998, now U.S. Pat. No. 6,008,806, which in turn is a continuation of prior application Ser. No. 08/355,410 filed Dec. 13, 1994, now U.S. Pat. No. 5,831,606, priority from the filing dates of which is hereby claimed under 35 U.S.C. § 120.

FIELD OF THE INVENTION

The present invention relates generally to data processing systems and, more particularly, to shell extensions for an operating system.

BACKGROUND OF THE INVENTION

Conventional operating systems include shells that provide user interfaces. Unfortunately, such shells are often limited in their capabilities and in the flexibility of options that they provide to an applications developer. For example, such conventional operating systems often provide shells that define context menus for each file system object. The list of menu items and associated operations provided by the shells for the context menus are often limited. Moreover, the menu items cannot be changed by applications.

Conventional shells are often additionally limited in that they predefine property sheet pages for file system objects. The property sheet pages are user interface elements that display property values for the associated file system objects and typically allow a user to change some of the displayed property values. Each property sheet page is associated with a subset of related properties for the objects.

The shells of conventional operating systems are further limited in that they provide predefined icons only for file types or objects classes. These shells do not facilitate the use of per-instance icons that are associated with each instance of an object or file. The shells of the conventional operating systems are further limited in that they only provide access to objects in the file system name spaces and provide no easy mechanism for integrating additional name spaces into the system.

Conventional operating systems are also limited as to drag-and-drop operations. In particular, applications have no ability to customize the functionality of a drop based upon a file object type. in conventional systems. Further, these conventional operating systems provide no ability to customize source objects in drag-and-drop operations.

SUMMARY OF THE INVENTION

The above-described difficulties encountered by shells of conventional operating systems are overcome by the present invention. In accordance with a first aspect of the present invention, a method is practiced in a data processing system that includes a video display and an object that has an associated context menu for specifying operations that may be performed relative to the object. The data processing system also includes an operating system with a shell that specifies predefined menu items in the context menu. In this method, a database of entries holding configuration information is provided within the data processing system. Menu items that are not predefined by the shell are registered in the database so that the menu items are included in the context menu. Each entry that is registered in this fashion includes an identification of code that is to be executed when the menu item of the object is selected by a user.

In accordance with a further aspect of the present invention, configuration information about a context menu handler is registered in database configuration information in a data processing system. A user makes a request and, in response to the request, the database is. accessed to obtain configuration information about the context. menu handler. The context menu handler is invoked to add menu items to a context menu of an object. A shell of an operating system provides at least one menu item for the context menu, but the context menu handler is used to add at least one additional menu item to the context menu for the object.

In accordance with an additional aspect of the present invention, a database of registration information is stored in a memory means in a data processing system. A representation of a per-instance icon for a file is also stored in the memory means. The representation of the per-instance icon is registered in the database of registration information along with an icon handler. The icon handler is used to find the representation of the per-instance icon. A request to display the per-instance icon is received arid, in response, the database is accessed to locate the icon handler. The icon handler then provides the per-instance icon to the operating system, which displays the per-instance icon on the video display.

In accordance with another aspect of the present invention, a database of registration information is stored in a memory means of a data processing. system. An object that has associated properties is provided within the data processing system. The data processing system includes a processing means that runs an operating system with a shell. The shell of the operating system provides at least one property sheet page for the object. A property sheet handler is registered in the database. The property sheet handler adds additional property sheet pages for the object. When a request to add at least one property sheet page for the object is received, the property sheet handler is used to add at least one property sheet page for the object.

In accordance with yet another aspect of the present invention, a data processing system includes a memory means, a video display and a processing means. The memory means holds an object and an operating system that includes a shell. The memory means also holds a registry for holding registration information. The registry holds at least one shell extension handler for extending capabilities of the shell of the operating system. The data processing system further includes a processing means for running the operating system and the shell extension handler. The shell extension handler may be a number of different types of handlers, including a context menu handler, an icon handler, a property sheet handler or a shell name space extension handler.

In accordance with another aspect of the present invention, a method is practiced in a data processing system that has a video display and an operating system that includes a file system for performing file system operations on file system objects. In this method, a copy-hook handler is provided to indicate whether a file system operation should be performed on a selected file system object. In response to a request to perform a specified file system operation on the selected file system object, the copy-hook handler is called to generate indication of whether the specified file system operation should be performed on the selected file system object. The indication that is generated by the copy-hook handler is used to determine whether to perform the specified file system operation on the selected file system object.

In accordance with a further aspect of the present invention, a video display displays a representation of a source object and a representation of a target object for a drag-and-drop operation. A data object extension handler is provided to customize the source object to determine a format for a data that is to transferred when a drag-and-drop operation is performed on the source object in response to a user using an input device. A drag-and-drop operation is initiated in response to the user using the input device. This drag-and-drop operation drags the representation of the source object to be positioned over the representation of the target object. The data object extension handler is invoked to determine the format for the data that is to be transferred from the source object in the drag-and-drop operation. The representation of the source object is dropped on the representation of the target object in response to the user using the input device to complete the drag-and-drop operation.

In accordance with yet another aspect of the present invention, a drop target extension handler is provided for customizing behavior of a target object when a drop occurs on the target object. The drag-and-drop operation is initiated on the source object in response to a user using an input device. In particular, the representation of the source object is dragged to be positioned over the representation of the target object. When a user drops the representation of the source object on the representation of the target object, the drop target extension handler is invoked to determine the behavior of the target object in response to the drop.

In accordance with an aspect of the present invention, a method is performed on a data processing system that has an operating system and classes of objects. A shell extension handler is provided for one of the classes of objects to extend the functionality of the shell relative to that class of objects. The shell extension handler is independent of the operating system and may be provided, for instance, by an application, program. The shell extension handler is invoked to extend the functionality of the shell for an object in the class of objects for which the shell extension handler is provided.

In accordance with an additional aspect of the present invention, a method is practiced in a data processing system that has a video display and an operating system. The operating system includes a name space mechanism for providing a name space of objects, including file system objects. The operating system also includes a name space viewer for viewing objects in the name space on the video display. In this method, a name space extension is provided by an application program to add non-file system objects to the name space. The name space extension is used to add these non-file system objects to the name space and the name space viewer is then used to view at least one of the non-file system objects that have been added by the name space extension.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 7 is a flow chart showing the steps that are performed to add additional property sheet pages for an object;

FIG. 9 is a flow chart illustrating in more detail how property sheets are added for an object in accordance with the preferred embodiment of the present invention;

DETAILED DESCRIPTION OF THE PREFERRED EMBODIMENT

Figure 1:
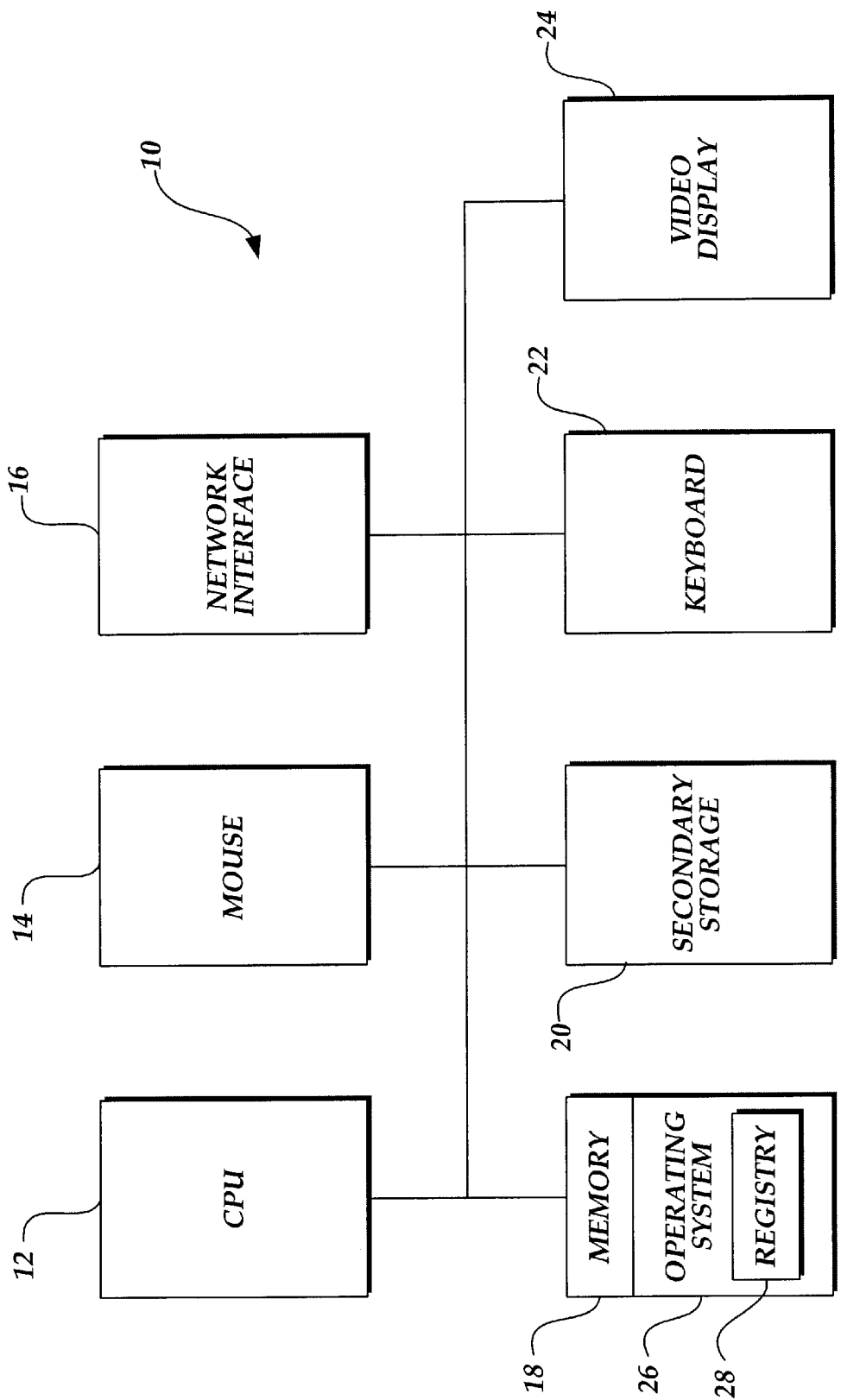
FIG. 1 is a block diagram of a data processing system that is suitable for practicing a preferred embodiment of the present invention.

The preferred embodiment of the present invention extends the capabilities provided by a shell of an operating system to allow an application developer to customize context menus, add property sheet pages for objects and provide per-instance icons for objects. Further, the preferred embodiment of the present invention facilitates the customization of drop behavior and the customization of source objects in drag-and-drop operations on a per-object type basis. A copy-hook handler is provided to enable an application to grant or withhold approval of copy, delete, move or rename commands on objects. In addition, the preferred embodiment of the present invention facilitates the addition of new name spaces to a name space that is visible through a browsing system-provided tool (known as the "explorer"). These shell extensions allow developers to customize to better suit the needs of their users.

The preferred embodiment of the present invention is practiced in an object-oriented environment that supports the "MICROSOFT" OLE 2.01 protocol developed by Microsoft Corporation of Redmond, Wash. In order to fully understand the preferred embodiment of the present invention, it is helpful to review some of the fundamental concepts employed within "MICROSOFT" OLE 2.01.

An "object class" is the definition of both a data structure and functions that manipulate the data structure. An "object" is an instance of an object class. A related "MICROSOFT" OLE 2.01 concept is that of an "interface." An interface is a group of semantically-related functions that are organized into a named unit. The name of the unit is the identifier of the interface. Interfaces have no instantiation in that the interface does not include code for implementing the functions that are identified in the interface; rather, the interface specifies a set of signatures for functions. "Instantiation" refers to the process of creating in-memory structures that represent an object so that the operations can be invoked on the object. When an object "supports" an interface, the object provides code for the function specified by the interface. Hence, an object that supports an interface is responsible for providing the code for implementing the functions of the interface. The code that is provided by the object must comply with the signatures specified by the interface.

The "MICROSOFT" OLE 2.01 protocol also provides "monikers". A moniker is a composite name for an object that includes a pointer to the object. More formally, a moniker is an object that supports the predefined IMoniker interface. The IMoniker interface includes a function for binding the moniker to the object to which the pointer of the moniker points. Binding causes an object to be placed in a running state so that the services supplied by the object may be invoked.

The shell extensions are implemented as shell extension, dynamic link libraries (DLLs). The shell extension DLLs are implemented by applications and constitute instances of interfaces. These shell extension DLLs are called when needed to extend the functionality of the shell as required by the application. The preferred embodiment of the present invention provides context menu handlers, icon handlers, property sheet handlers, copy-hook handlers, name space extension handlers, data object extension handlers, and drop target extension handlers. Each of these handlers will be described in more detail below.

FIG. 1 is a block diagram of a computer system 10 that is suitable for practicing the preferred embodiment of the present invention. The computer system 10 includes a central processing unit (CPU) 12 that is connected to a number of input/output devices, including mouse 14, keyboard 22 and video display 24. The computer system 10 also includes a network interface 16 for interfacing the computer system 10 with a network. Memory 18 and secondary storage 20 store data and code. The memory 18 holds a copy of an operating system 26 that includes a registry 28 for holding configuration information.

The registry 28 is organized as a hierarchically structured tree and is roughly analogous to the registry provided by the "MICROSOFT" WINDOWS NT operating system. Each node of the tree is identified by a key name composed of ASCII characters. Keys may contain other keys, known as subkeys. The registry has a predefined root key called $HKEY_{CLASSES}\_ROOT$. At the same level of the hierarchy are three predefined keys: HKEY_LOCAL_MACHINE, HKEY_CURRENT_CONFIG and HKEY_USER. Each of these predefined keys acts as a root of a separate subtree in the registry. The subtree associated with HKEY_LOCAL_MACHINE holds non-user specific information about the computer system. The HKEY_CURRENT_CONFIG key serves as the root of a subtree that holds non-user specific configuration information that pertains to hardware. Lastly, the HKEY_USER key is at the root of a subtree that. holds user specific configuration information. The registry 28 is used by numerous applications, such as will be described below.

Figure 2:
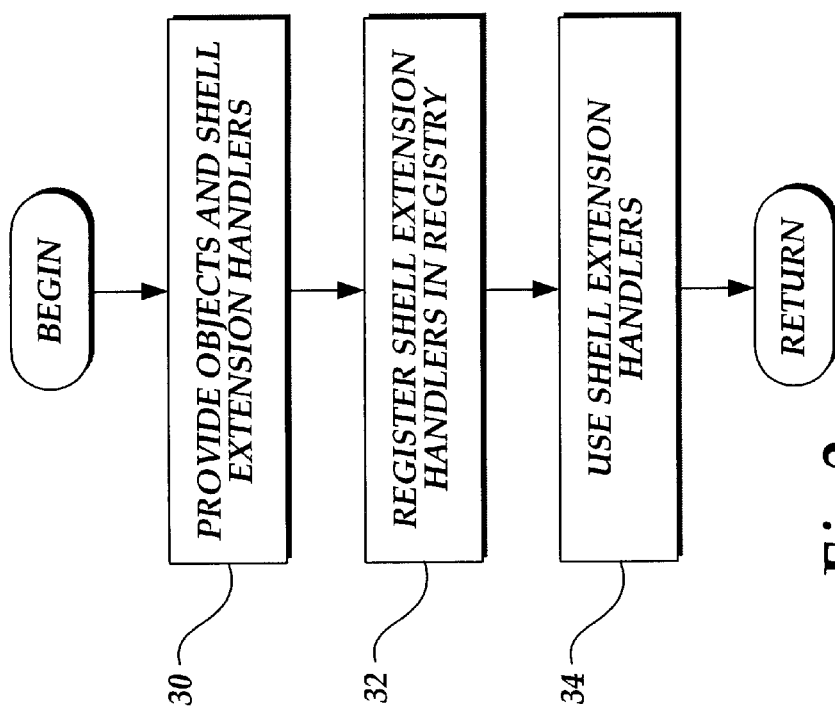
FIG. 2 is a flow chart that provides an overview of the steps that are performed to extend the functionality of an operating system shell in accordance with the preferred embodiment of the present invention.

FIG. 2 is a flowchart that provides an overview of the steps that are performed to facilitate the shell extensions within the preferred embodiment of the present invention. Initially, objects on which the shell extensions operate and shell extension handlers must be provided within the memory 18 of the computer system 10. The shell extension handlers are then registered within the registry 28 (step 32) so that the computer system 10 is aware of the extension handlers and may utilize them. These shell extension handlers are then used to provide the desired shell extensions (step 34). The shell extensions extend the functionality provided by the operating system to aid developers of applications.

The features of the shell extensions may be implemented, by performing the steps shown in FIG. 2. In step 32, the shell extension handlers must be registered in the registry 28. Set forth below is an example of the format of the registry 28 for a word processor application to support these features.

```
1:   .doc = Awordprocessor
2:   AWordProcessor = A Word Processor
3:   shell = open print preview
4:   open
5:   commnand = c:\aword\aword.exe %1
6:   print
7:   command = c:\aword\aword.exe /p %1
8:   printTo
9:   command = c:\aword\aword.exe /p %1%2%3
10:  preview = Pre&view
11:  command = c:\aword\aword.exe /r %1
12:  shellex
13:  ContexMenuHandlers = ExtraMenu
14:  ExtraMenu = (00000000-1111-2222-3333-00000000000001)
15:  PropertysheetHandlers = SummaryInfo
16:  SummaryInfo = (00000000-1111-2222-3333-
     00000000000002)
17:  IconHandler = 00000000-1111-2222-3333-00000000000003)
18:  DefaultIcon = %1
```

This example portion of the registry will be discussed. in more detail below when focusing on the particular types of extensions.

The preferred embodiment allows a developer to customize context menus for objects by specifying customized static verbs and dynamic verbs. A "verb" is a kind of action that is defined by an object and its associated server. In the context menus, a verb is an action that is performed in response to the selection of an associated menu item. For example, the menu item "Open" has an associated verb that opens the file or object. Verbs are supported by the "MICROSOFT" OLE 2.01 protocol. Static verbs are those verbs that are registered under the "shell" key (note line 3 in the above example) within the registry 28. Static verbs may be contrasted with dynamic verbs, which are discussed in more detail below. In the above example, static verbs for the "Open", "Print", "PrintTo" and "Preview" menu items are registered in the registry 28. In particular, note lines 3–11 in the above example.

Figure 3:
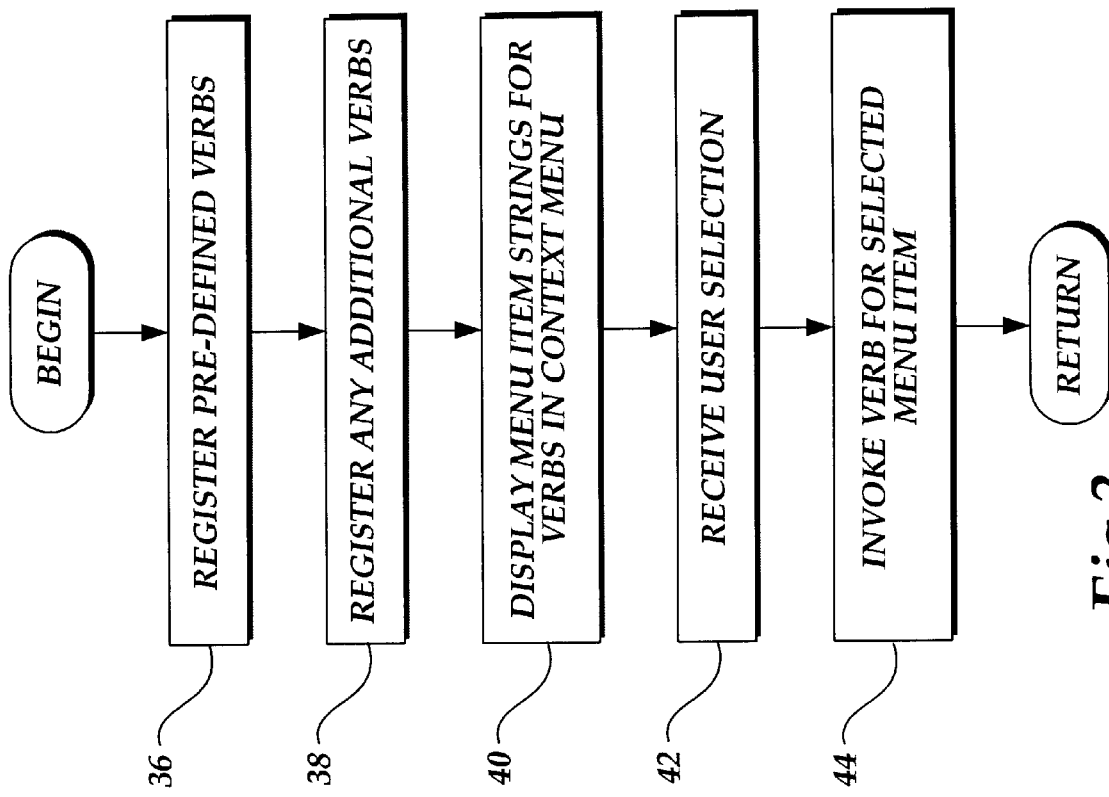
FIG. 3 is a flow chart of the steps that are performed to add verbs to a context menu in accordance with the preferred embodiment of the present invention.

An application implements a context menu handler interface IContextMenu to add more items to a context menu for a file object. The added items may be object class specific or instance specific. FIG. 3 is a flowchart of the steps that are performed to add static verbs to context menus of an object in the preferred embodiment of the present invention. First, any predefined verbs (i.e., those that the shell supports) and additional verbs provided by a developer are registered within the registry 28 (steps 36 and 38 in FIG. 3). The operating system 26 provides functions that may be called to add entries within the registry 28. In the preferred embodiment described herein, these functions are utilized by developers to create entries in the registry 28 like those shown in lines 4–11 of the above example. These verbs are registered in the shell section of the registry and are added to context menus of the specified object type (e.g., word processing documents). The registration of the verb specifies their menu item strings. Once the verbs are registered and the context menu has been activated, menu item strings associated with the verbs are displayed in the context menu (step 40). For the above example, entries for "Open," "Print," "PrintTo" and "Preview" are all displayed as menu item strings in the context menu. A user then selects one of the menu items (step 42), and the verb for the selected menu item is activated (step 44). Path names are provided within the registry 28 for the verbs and are used to invoke the verbs in step 44 by calling the InvokeCommand( ) function of the IContextMenu interface (which is described in more detail below). Examples of such path names are set forth at lines 5, 7, 9 and 11 in the above example.

Figures 4, 5:
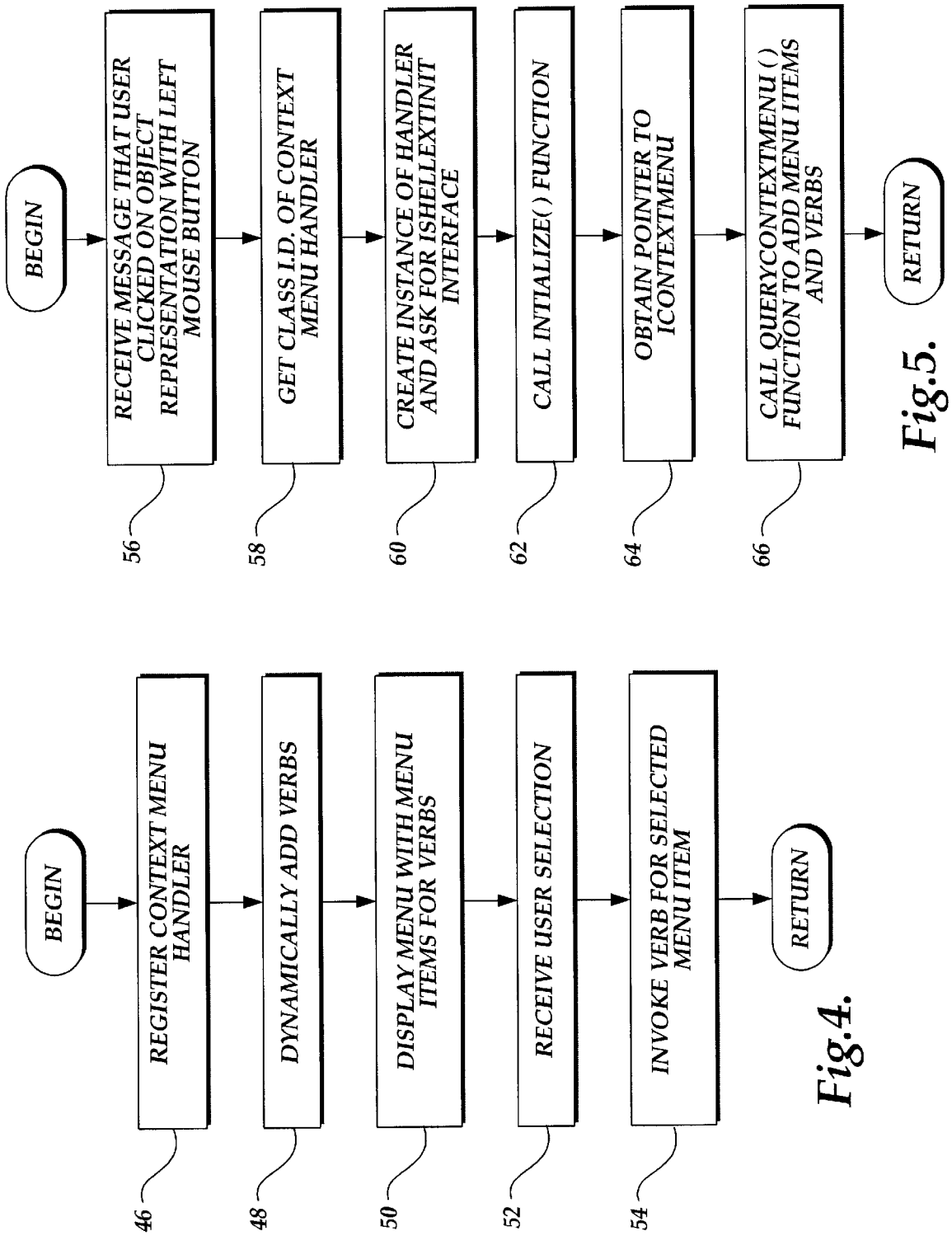
FIG. 4 is a flow chart showing the steps that are performed to add dynamic verbs to a context menu in accordance with the preferred embodiment of the present invention.
FIG. 5 is a flow chart showing the steps that are performed to dynamically add verbs to a context menu in accordance with the preferred embodiment of the present invention.

As discussed above, an application may also register dynamic verbs. Unlike static verbs, dynamic verbs are not statically assigned to context menus. FIG. 4 is a flowchart of the steps that are performed to utilize dynamic verbs in the preferred embodiment of the present invention. The process is initiated by registering a context menu handler (step 46). An object class definition for the context menu object handler class must also be provided. In the example given above, lines 13 and 14 set forth the entries for registering the context menu handler. In particular, the class ID for the context menu handler class of objects is registered under the shellex key so that the shell knows what type of object to create when a context menu handler is needed. Instance specific context menus require a context menu handler. The context menu handler class ID is passed to a class factory, as defined within Microsoft OLE 2.01, to create an object of that class. A class factory. is an object in "MICROSOFT" OLE 2.01 that supports the IClassFactory interface and is used to create instances of an object class in memory. The IClassFactory interface includes a function, CreateInstance( ) for creating such instances of objects classes in memory. Each context menu handler object is a DLL that allows developers to dynamically add verbs for a context menu. After the context menu handler has been registered, it is used to dynamically add verbs (step 48). This step will be described in more detail below. After tile verbs have been added, the context menu is displayed with the menu items for all of the verbs, including those that have been added (step 50). A user then makes a selection that is received by the system (step 52), and the verb associated with the selected menu item is invoked by calling the InvokeCommand( ) function (step 54).

FIG. 5 is a flowchart illustrating the steps that are performed to dynamically add a verb (step 48 in FIG. 4). A user initiates the process of adding verbs to a context menu by clicking a representation of an object with the left button of mouse 14. A message is received that indicates that the user has clicked on the object representation with the left mouse button (step 56). The class ID of the context menu handler is obtained (step 58). The class ID of the context menu handler is contained within the registry 28. The class ID in the example given above is contained in brackets on line 14. An instance of the context menu handler is created (i.e., an object of the specified object class is created) and the pointer for the IShellExtInit interface is requested (step 60). The "MICROSOFT" OLE 2.01 protocol provides interfaces for creating objects of given object classes. These functions are utilized to create an instance of a context menu handler. The IShelExtInit interface is used by the explorer to initialize shell extension objects, like the context menu handler. This interface is defined as follows.

undef INTERFACE
define INTERFACE *IShellExtInit
DECLARE_INTERFACE_(IShellExtInit, Iunknown)
(
   //* IUnknown methods *
   STDMETHOD(QueryInterface) (THIS_REFRIID
     riid, LPVOID *ppvObj)
   PURE;
   STDMETHOD_(ULONG, AddRef) (THIS) PURE;
   STDMETHOD_(ULONG, Release) (THIS) PURE;
   // * IShellExtInit methods *
   STDMETHOD(Initialize) (THIS_LPCITEMIDLIST
     pidlFolder, LPDDATAOBJECT lpdobj, HKEY
     hkeyProgID) PURE;
)

typedef IShellExtInit * LPSHELLEXTINIT;

IUnknown is an interface that all objects must support by definition to comply with "MICROSOFT" OLE 2.01. Several methods from that interface are incorporated into the IShellExtInit interface. Amongst the functions added by this interface is the Initialize( ) function. The Initialize( ) function is then called to initialize the context menu handler object (step 62 in FIG. 5). A pointer to the IContextMenu interface instance provided by the context menu handler object is obtained (step 64). The IContextMenu interface is defined as follows.

DECLARE_INTERFACE_(IcontextMenu, Iunknown)
(
   // * IUnknown methods *
   STDMETHOD(QueryInterface) (THIS_REFIID riid,
     LPVOID*ppvObj,) PURE; STDMETHOD_
     (ULONG, AddRef) (THIS) PURE;
   STDMETHOD_(ULONG, Release) (THIS) PURE;
   STDMETHOD(QueryContextMenu) (THIS_
     HMENU hmenu,
     UINT indexMenu,
     UINT idCmdFirst,
     UINT idCmdLast,
     UINT uFlags) PURE;
   STDMETHOD(InvokeCommand) (THIS_
     LPCMINVOKECOMMANDINFO lpici) PURE;
   STDMETHOD (GetCommandString) (This_
     UINT idCmd,
     UINT uFlags,
     UINT *pwReserved, LPSTR pszName,
UINT cchMax) PURE;
);

Specifically, a QueryInterface( ) function call is made on the context menu handler object to obtain a pointer to the instance of the IContextMenu interface provided by the context menu handler object. The IContextMenu interface includes three functions that are of interest: the QueryContextMenu( ) function, the InvokeCommand( ) function, and the GetCommandString( ) function. The QueryContextMenu( ) function allows the insertion of one or more menu items to a specified menu at a specified location. Parameters identify the menu items, the menu, and the location. The InvokeCommand( ) function is used to invoke a given command when the user selects the command, and the GetCommandString( ) function is used to get the command name or help text for a specified command.

The QueryContextMenu( ) function is then called to add menu items to the identified context menu (step 66). These menu items and their associated verbs may then be used.

Figure 6:
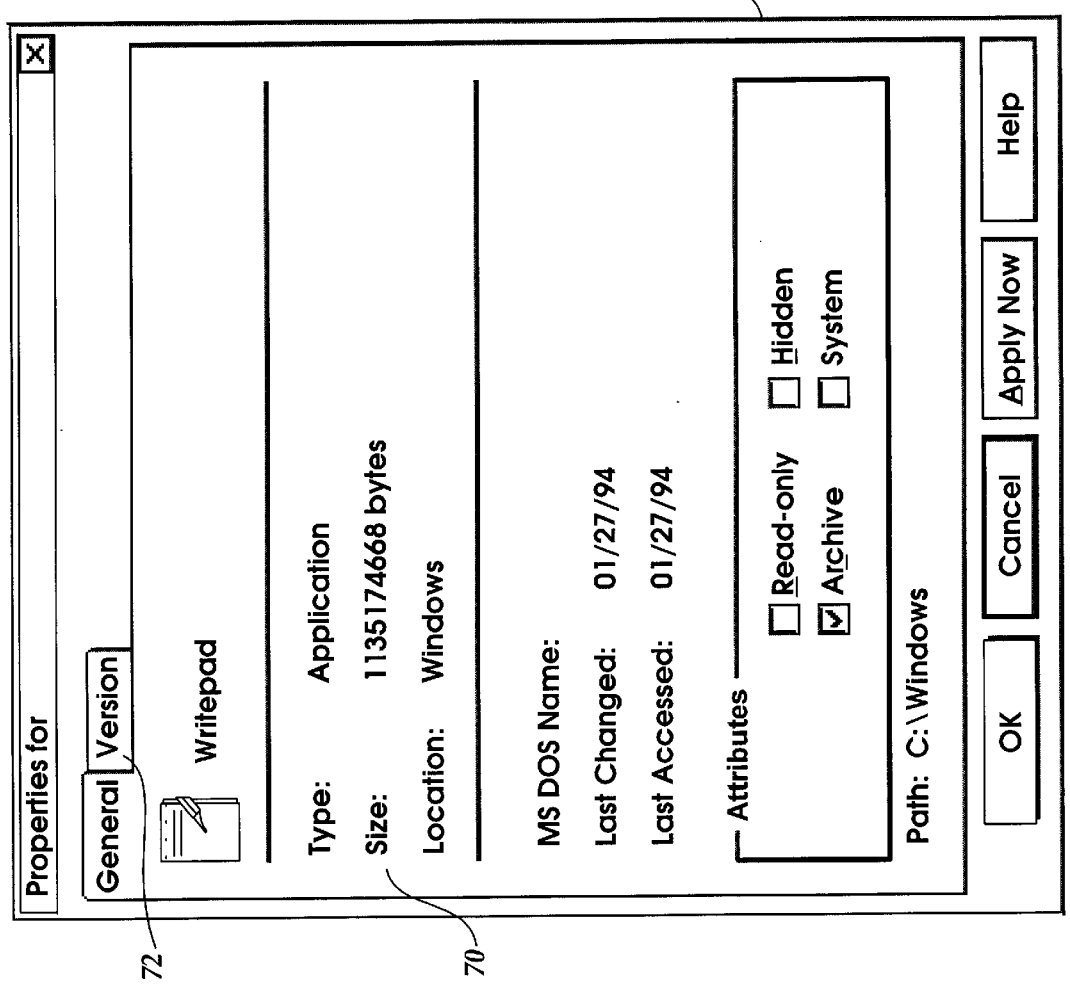
FIG. 6 depicts illustrative property sheets for an object.

The preferred embodiment of the present invention also facilitates the extension of the shell of the operating system 26 by allowing an application to add property sheet pages. This capability is provided in large part by registering a property sheet handler for each property sheet page to be added. FIG. 6 shows an example of a window 68 for displaying two property sheets, 70 and 72. The fill body of the "General" property sheet 70 is visible in FIG. 6, whereas only a tab for the "Version" property sheet 70 is visible. In the example shown in FIG. 6, the property sheets are associated with a file, denoted as "WordPad". The property sheets list the names of properties of the file and the current values of the properties. The preferred embodiment of the present invention allows the addition of property sheets for objects such as the "WordPad" file. Thus, developers can create new property sheets that supplement those supported by the shell. For example, suppose that the "WordPad" object is provided by the operating system and typically only has the "General" property sheet page 70 associated with it. The preferred embodiment of the present invention allows the addition of the "Version" property sheet page by a shell extension.

Figure 8:
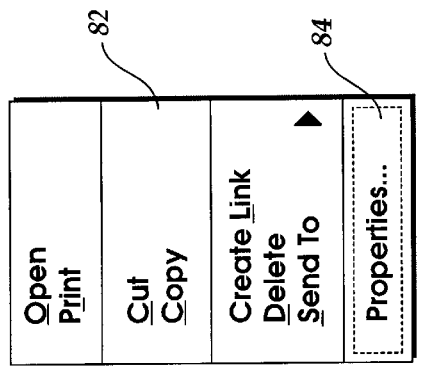
FIG. 8 is an example of a menu that has a command for adding property sheets in accordance with the preferred embodiment of the present invention.

FIG. 7 is a flowchart of the steps that are performed to allow the addition of property sheet pages. A property sheet handler for adding property sheet pages is registered within the registry 28 (step 74 in FIG. 7). An example of such a registration is provided at lines 15 and 16 in the above example. Later when the appropriate user actions (such as clicking the right mouse button) are performed, a context menu with a "Properties . . . " command is displayed on the video display 24 (step 76). FIG. 8 shows an example of such a context menu 82 with a menu item 84 for "Properties . . . " The user then selects the "Properties . . . " menu item (step 78), and the property sheet handler is invoked to add property sheet pages (step 80).

FIG. 9 is a flowchart showing in more detail the steps that are performed to add property sheet pages using the property sheet handler (see step 80 in FIG. 7). A class ID for the property sheet handler is obtained by accessing the registry 28, where the registration information for the property sheet handler is held (step 86). This retrieved class ID is then used in creating an instance of the property sheet handler and obtaining a pointer to the IShellExtInit interface (step 88). As was discussed above, this interface includes the Initialize( ) function. The Initialize( ) function is called to initialize the property sheet handler object that has been newly created (step 90). An interface pointer to the IShellPropSheetExt interface is obtained by calling the QueryInterface( ) function (step 92 in FIG. 9). The IShellPropSheetExt interface is defined as follows.

```
#undef INTERFACE
#define INTERFACE IShellPropSheetExt
DECLARE_INTERFACE_(IShellPropSheetExt,
    IUnknown)
(
    // * IUnknown methods *
    STDMETHOD(QueryInterface) (THIS_REFIID riid,
        LPVOID*ppvObj) PURE;
    STDMETHOD_(ULONG, AddRef) (THIS) PURE;
    STDMETHOD_(ULONG, Release) (THIS) PURE;
    // *** IShellPropSheetExt methods ***
    STDMETHOD(AddPages)(THIS_
        LPFNADDPROPSHEETPAGE lpfnAddPage,
        LPARAM lparam) PURE;
    STDMETHOD(ReplacePage)(THIS UINT uPageID,
        LPFNADDPROPSHEETPAGE lpfnReplaceWith,
        LPARAM lpParam) PURE;
```

The IShellPropSheetExt interface is used to allow property sheet extensions for adding additional property sheet pages. This interface includes the AddPages( ) function, which adds property sheet pages for an object. The AddPages( ) function is then called to add the property sheet pages (step 94). For each property sheet page that is added, a page object is created by calling a CreatePropertySheetPage( ) function, which is provided in the operating system 26 as part of the application program interfaces (API's) that are available.

Figure 10:
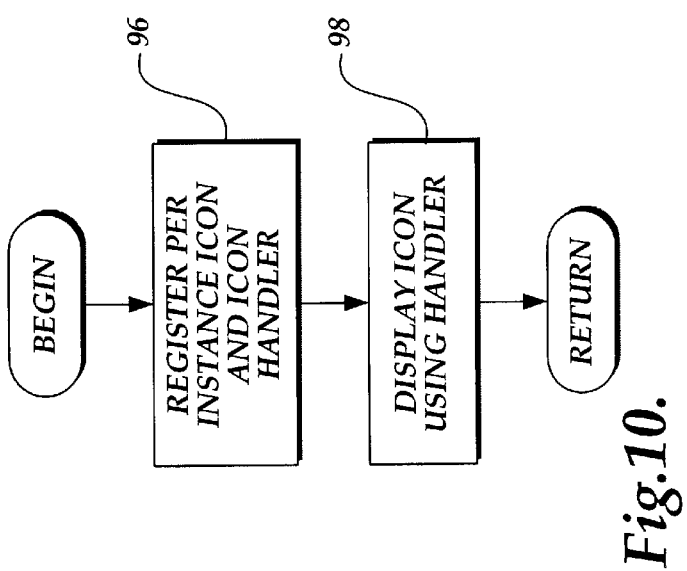
FIG. 10 is a flow chart showing the steps that are performed to use per-instance icons for an, instance of an object in accordance with the preferred embodiment of the present invention.

FIG. 10 is a flowchart that shows the steps that are performed to facilitate per-instance icons for objects. Representations of the per-instance icons, such as metafiles or bitmaps, are registered within the registry 28, along with an icon handler object (step 96 in FIG. 10). In the example given above, the class ID for the icon handler is registered at line 17. When the shell of the operating system 26 needs to display a representation of the object associated with the icon, it calls the icon handler to display the per-instance icon (step 98).

Figure 11:
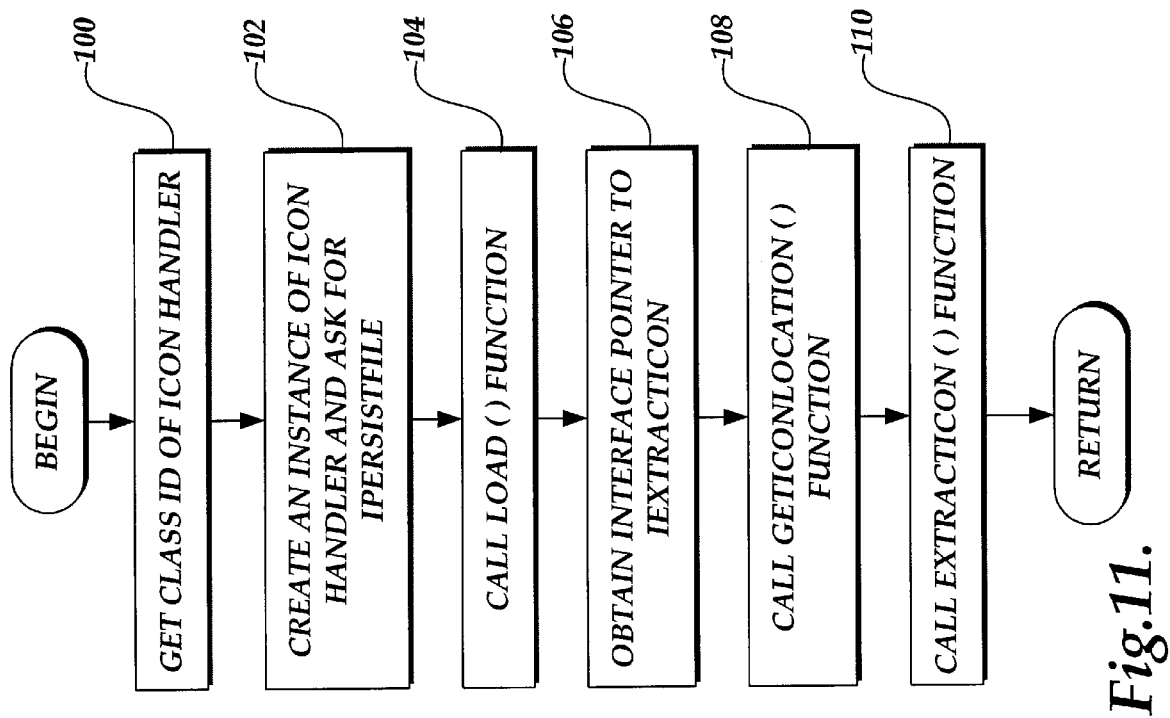
FIG. 11 is a flow chart showing in more detail the steps that are performed to register a per-instance icon handler in the preferred embodiment of the present invention

FIG. 11 shows the steps performed to display the icon using the icon handler in more detail (see step 98 in FIG. 10). Initially, a class ID for the icon handler is obtained by accessing the registry 28 (step 100). An instance of the icon handler is created and a pointer for the IPersistFile interface instance provided the icon handler object is obtained (step 102). Using the pointer for the IPersistFile interface (defined within Microsoft OLE 2.01 ) of the icon handler object that is provided, the shell calls the Load( ) function to initialize the icon handler object (step 104).

An interface pointer for the IExtractIcon interface provided by the icon handler is obtained by calling the QueryInterface( ) function. The IExtractIcon interface is defined as follows.

```
DECLARE_INTERFACE_(IExtractIcon, IUnknown)
(
    // * IUnknown methods *
    STDMETHOD(QueryInterface) (THIS_REFIID riid,
        LPVOID *ppvObj) PURE;
    STDMETHOD_(ULONG, AddRef) (THIS) PURE;
    STDMETHOD_(ULONG, Release) (THIS) PURE;
    // *** IExtractIcon methods ***
    STDMETHOD(GetIconLocation) (THIS_
        UINT uFlags
        LPSTR szIconFile,
        UINT cchMax,
        int *piIndex,
        UINT * pwFlags) PURE;
    STDMETHOD(ExtractIcon) (THIS_
        LPCSTR pszFile,
        UINT nIconIndex,
        HICON *phiconLarge,
```

```
    HICON *phiconSmall,
    UINT nIconSize) PURE;
);
typedef IExtractIcon* LPEXTRACTICON;
```

The GetIconLocation( ) function returns an icon location, and the ExtractIcon function extracts an icon image from a specified file. The GetIconLocation( ) function is then called to obtain a location of the file that holds a representation of the icon (step 108). The ExtractIcon( ) function called to extract the icon representation out of the file and use the extracted representation to display the icon with the shell (step 110).

Another type of shell extension handler that may be registered in the preferred embodiment of the present invention is a copy-hook handler. An application registers to copy-hook handler so that the shell of the operating system 26 calls the copy-hook handler before the shell moves, copies, deletes, or renames a folder or printer object. The copy-hook handler does not perform the operation itself but rather provides approval for the requested operation. When the shell receives approval from the copy-hook handler, it performs the requested file system operation.

Figure 12:
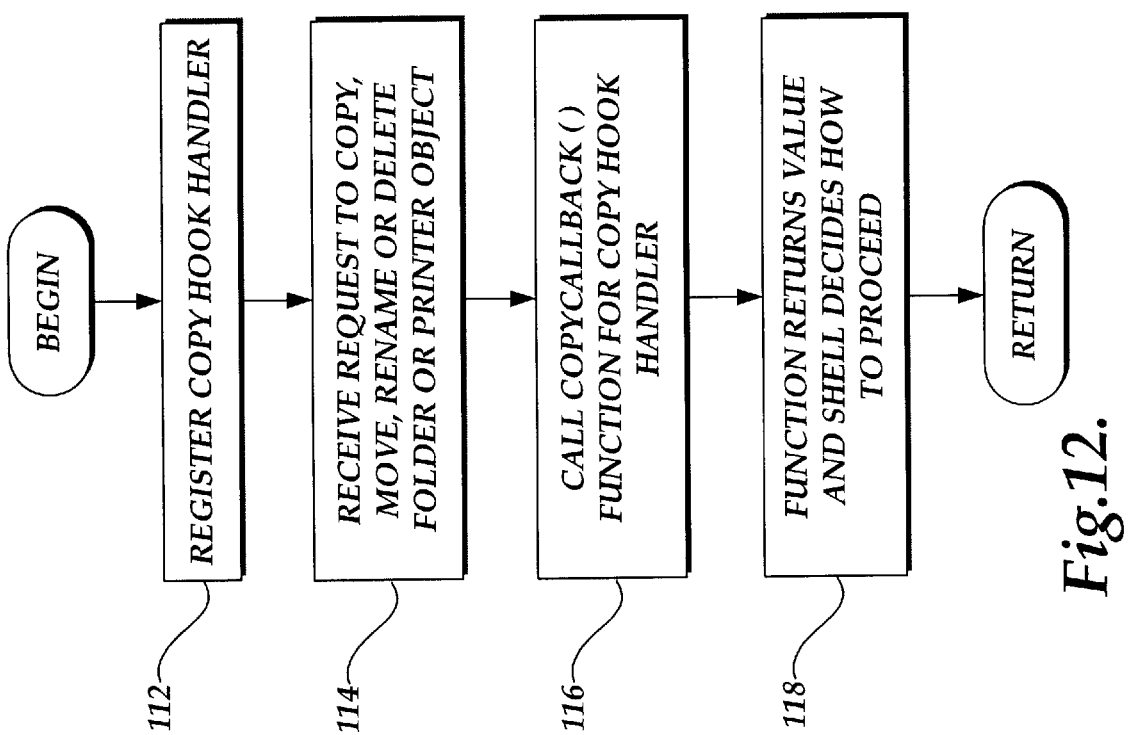
FIG. 12 is a flow chart illustrating the steps that are performed to use a copy hook handler in accordance with the preferred embodiment of the present inventions.

FIG. 12 is a flow chart of the steps that are performed to utilize a copy-hook handler in accordance with the preferred embodiment of the present invention. Initially the copy-hook handler is registered within the registry 28 (step 112 in FIG. 12). The shell directly initializes the copy-hook handler rather than calling the IShellExtInit or IPersistFile interfaces. A copy-hook handler supports the ICopyHook interface, which is defined as follows:

```
DECLARE_INTERFACE_(ICopyHook, IUnknown) //
    sl
(
    // * IUnknown methods *
    STDMETHOD(QueryInterface) (THIS_REFIID riid,
        LPVOID * ppvObj) PURE;
    STDMETHOD_(ULONG, AddRef) (THIS) PURE;
    STDMETHOD_(ULONG, Release) (THIS) PURE;
    STDMETHOD_(UNIT, CopyCallback) (THIS_
        HWND hwnd, UINT wFunc,
        UINT wFlags, LPCSTR pszSrcFile, DWORD
            dwSrcAttribs, LPCSTR pszDestFile, DWORD
            dwDestAttribs) PURE;
);
typedef ICopyHook * LPCOPYHOOK;
```

The ICopyHook interface includes a CopyCallBack( ) function that is called and returns an integer value that indicates whether the shell should perform the requested file system operation. The method may return an integer value that encodes a "YES" response that specifies that the operation should be carried out, an integer value that encodes a "NO" response that specifies that the operation should not be performed or an integer value that encodes a "CANCEL" response that specifies that the whole operation should be canceled. For example, where a batch of files is being copied, "CANCEL" cancels the entire operation for all files on the list, whereas "NO". skips a file on the list that is being copied.

Returning to FIG. 12, the shell receives a request to copy, move, rename or delete a folder or printer. object (step 114). The shell then calls the CopyCallBack( ) function for the copy-hook handler (step 116). The function returns an integer value and the shell determines, based upon the integer value, whether to perform the operation or not (step 118).

The preferred embodiment of the present invention also provides two varieties of shell extensions that concern drag-and-drop operations. The first variety is the data object extension which allows the customization of a source object during a drag-and-drop operation. The "MICROSOFT" OLE 2.01 protocol provides a uniform data transfer mechanism that is described in copending U.S. application, "Uniform Data Transfer," Ser. No. 08/199,853, filed on Feb. 22, 1994. The uniform data transfer mechanism allows the specification of a data format in which a data transfer operation is to be performed. The uniform data transfer mechanism is used during drag-and-drop operation in the preferred embodiment of the present invention. The data object extension handler allows data to be transferred in a format that is different from the data format of the source object. Thus, for example, a portion of text in a document may be dragged out of the document as a scrap and dropped in a file by using a data object extension handler that specifies that the data is to be transferred as an OLE embedding rather than a file. As a result, the scrap is dropped as an embedding.

Figure 13:
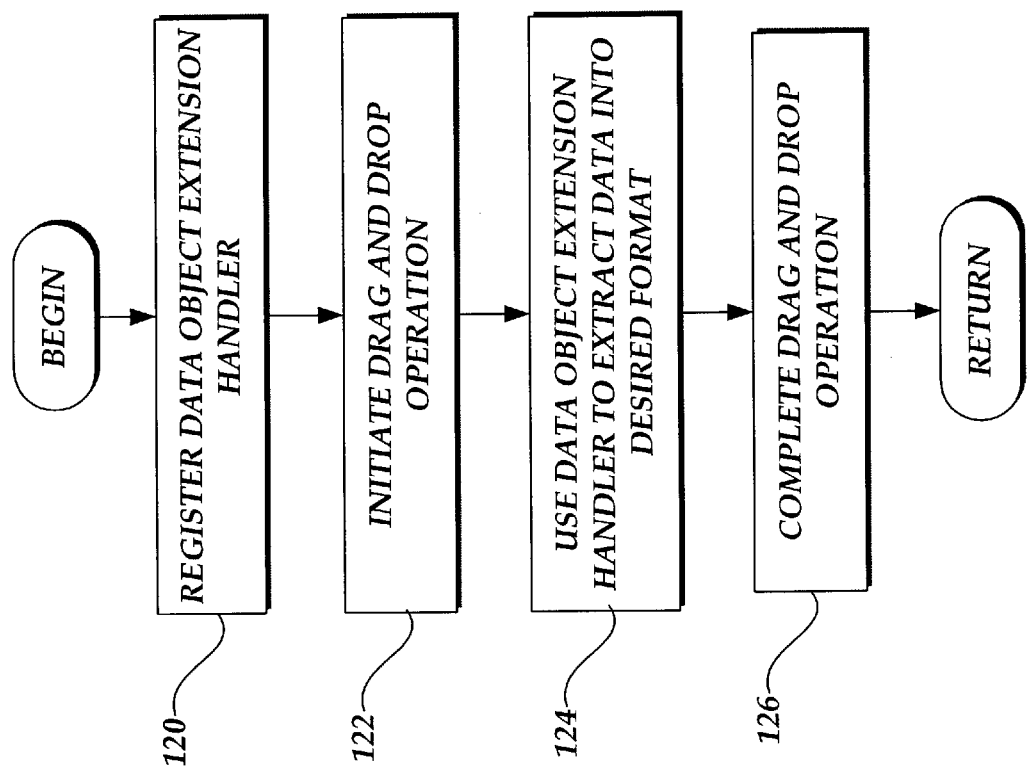
FIG. 13 is a flow chart illustrating the steps that are performed to utilize a data object extension handler in accordance with the preferred embodiment of the present invention.

FIG. 13 is a flow chart illustrating the steps that are performed to utilize the data object extension handlers in the preferred embodiment of the present invention. Initially, the data object extension handler must be registered with the registry 28 (step 120 in FIG. 13). Data object extension handlers are registered on a per-object class basis such that multiple objects of a given class may use the same data object extension handler. A drag-and-drop operation is then initiated using the mouse 14 (step 122). As part of the drag-and-drop operation, the data object extension handler is called by the shell to extract data from the source object into the desired format (step 124). The drag-and-drop operation is then completed with the data being transferred in the appropriate data format (step 126).

The preferred embodiment of the present invention additionally provides drop target extensions. Drop target extension handlers may be registered on a per-object class basis to customize the functionality of drop targets. The "MICROSOFT" OLE 2.01 protocol provides facilities for objects to register as drop targets so that they may receive drops in drag-and-drop operations. The drop target extension handlers customize the behavior of drop targets.

Figure 14:
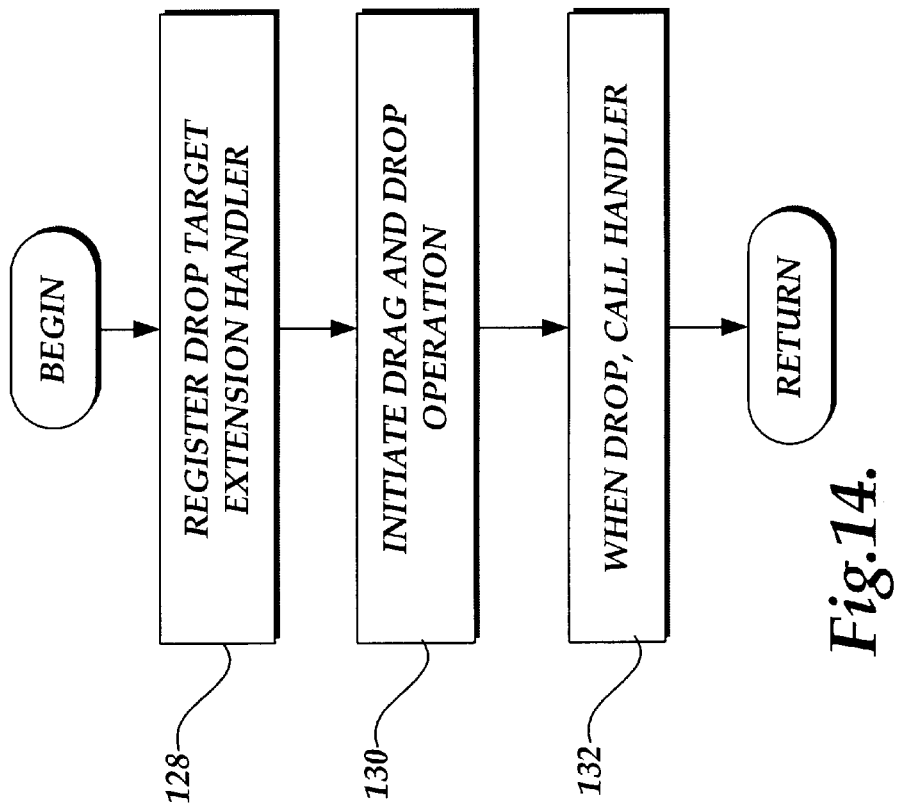
FIG. 14 is a flow chart illustrating the steps that are performed to use a drop target extension handler in accordance with the preferred embodiment of the present invention.

FIG. 14 shows the steps that are performed to use a drop target extension handler in the preferred embodiment of the present invention. Initially a drop extension handler is registered on a per-object class basis with the registry 28 (step 128 in FIG. 14). A drag-and-drop operation is initiated using the mouse 14 (step 130 in FIG. 14). When the object is dropped, the shell calls the drop target extension handler to determine whether the drop should be accepted and, if accepted, to determine what steps should be performed (step 132).

An example helps to illuminate the functionality that is provided by the drop target extension handlers. Suppose that a drop target is an executable file (i.e., an EXE file). In such a case, when an object is dragged and dropped on the executable file, the drop target extension handler is run. The drop target extension handler causes the executable file to run using the dropped object. For example, suppose that a document is dropped on a word processing program executable file. In such a case, the dropped target extension handler causes the word processing program to be run to edit the document that was dropped.

It should be appreciated that the above-described extensions apply not only to file system objects but also to network objects that may be browsed using the shell explorer. The appropriate handlers may be registered in the registry 28 under a particular network provider or under the "Network" class.

Figure 15:
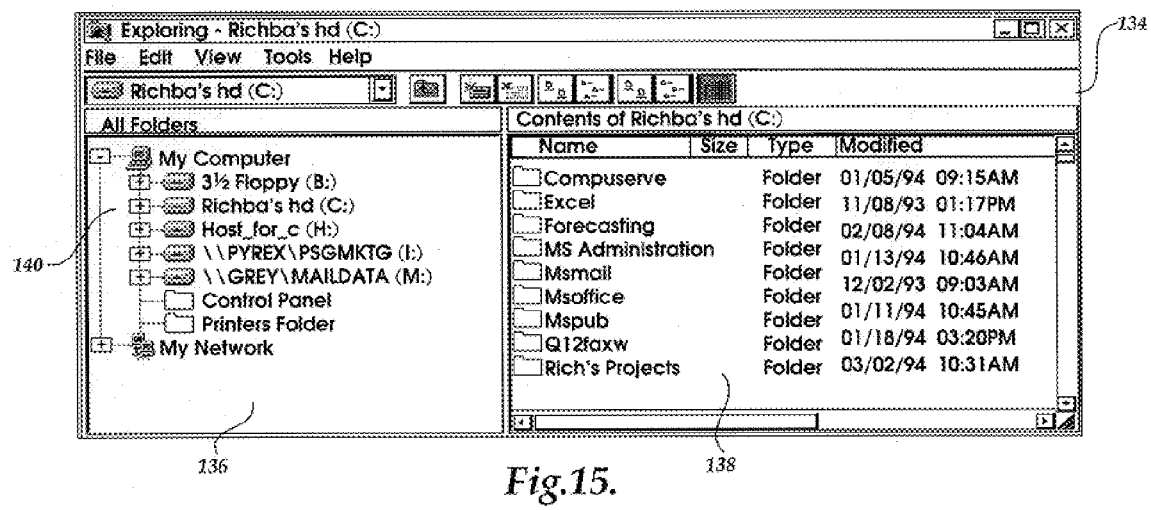
FIG. 15 is an example of an explorer window used in the preferred embodiment of the present invention.

An additional extension provided by the shell of the operating system 26 is the ability to add additional name spaces that are visible to the explorer. For example, a mail folder holding mail messages may be plugged into the explorer name space. Thus, vendors may create new name spaces and simply plug the new name spaces into the explorer name space. This ability to add new name spaces is not limited to particular object types. A developer may manipulate and view objects that are visible in the explorer name space. The explorer name space is a hierarchical name space that, in the preferred embodiment, includes file system objects, control panel items, printer objects and network objects. FIG. 15 depicts an example of a user interface that is provided for the explorer. The explorer is a part of the operating system 26 that allows the user to browse the explorer name space. The user interface 134 for the explorer includes a first portion 136 that depicts the various folders in the hierarchy of the explorer name space: The second portion 138 shows the folder contained within a particular folder that is selected from amongst those in the first portion 136. The selected folders may include sub-folders or simply its own contents. For example, in FIG. 15, the second portion 138 shows in more detail the contents of folder 140.

Figure 16:
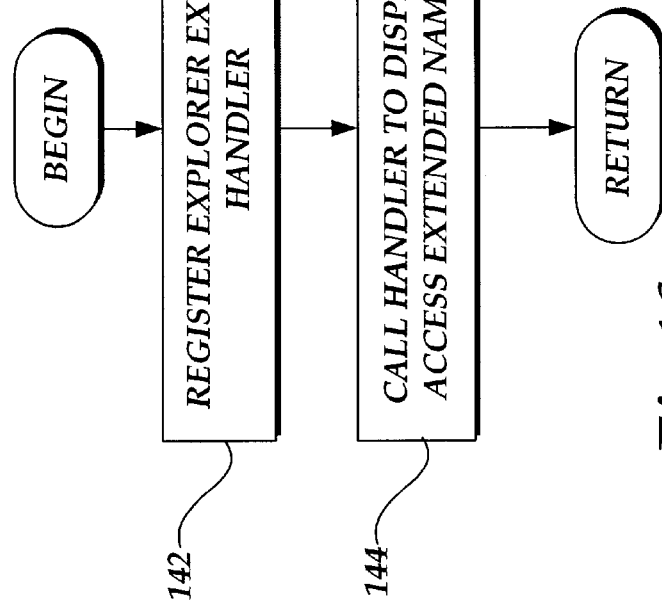
FIG. 16 is a flow chart showing the steps that are performed to add additional name spaces to the explorer name space in the preferred embodiment of the present invention.

In order to incorporate a name space into the explorer name space, a developer needs to provide explorer extension handlers. The handlers are folders that are integrated into the explorer name space. These handlers act as in process server DLLs as defined within the "MICROSOFT" OLE 2.01 protocol. The explorer extension handlers must be registered within the registry 28. FIG. 16 provides a flowchart of the steps that are performed to facilitate the integration of such additional name spaces into the explorer name space. First, the explorer extension handler must be registered within the registry 28 (step 142 in FIG. 16). The explorer extension handlers may be registered under the "My Computer" directory within the explorer name space or under other file system directories. To put an extension under the "My Computer" directory, the class ID of the explorer extension handler should be registered under "HKEY_MACHINE\Software\Windows\CurrentVersion\Explorer". When, instead, the class ID of the explorer extension handler is to be registered in a file system directory, a special file system directory should be created.

Figure 17:
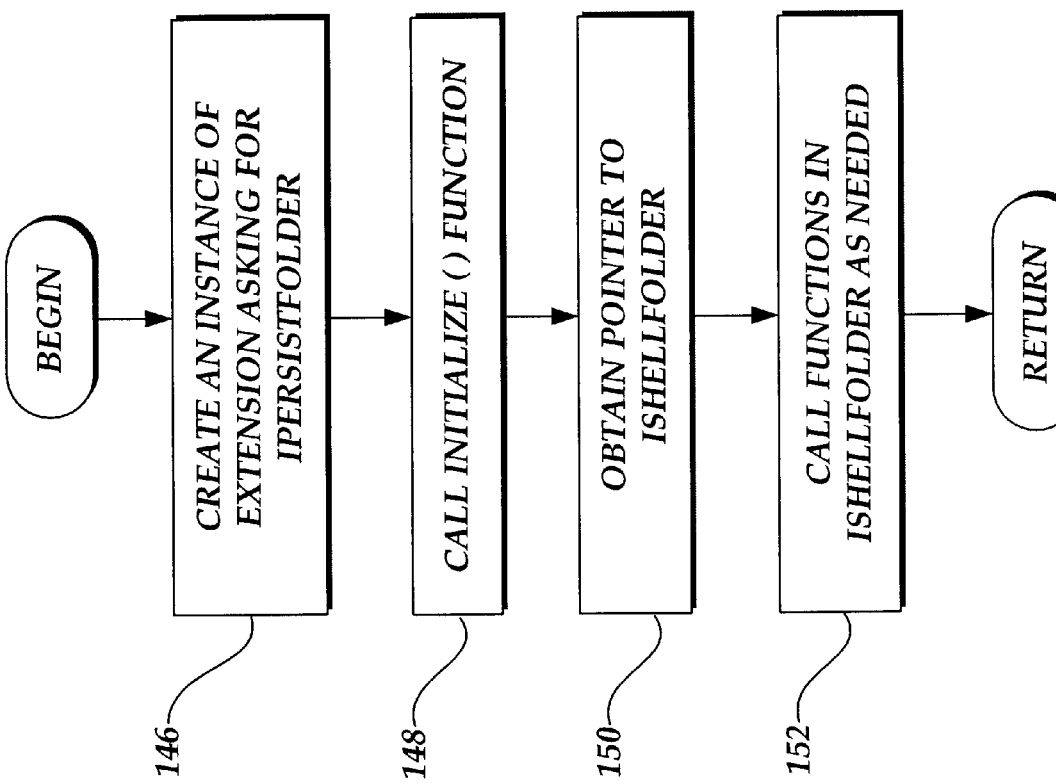
FIG. 17 is a flow chart of the steps that are performed to add a shell folder object to the explorer name space.

The explorer extension handler is then called to display and gain access to the extended name space of the handler (step 144 in FIG. 16). FIG. 17 shows in more detail the steps that are performed to realize the displaying and accessing of the extended name space. An instance of the explorer extension handler is created and an interface pointer to the instance of the IPersistFolder that the handler provides is obtained (step 246 in FIG. 17). The IPersistFolder interface is defined as follows.

undef INTERFACE
    #define INTERFACE IPersistFolder
    DECLARE_INTERFACE_(IPersistFolder, IPersist) // fld
    (
      // * IUnknown methods *
      STDMETHOD(QueryInterface( (THIS_REFIID riid, LPVOID * ppvObj) PURE;
      STDMETHOD_(ULONG, AddRef) (THIS) PURE;
      STDMETHOD_(ULONG, Release) (THIS) PURE;
      // * IPersist methods *
      STDMETHOD(GetClassID) (THIS_LPCLSID lpClassID) PURE;
      // * IPersistFolder methods *
      STDMETHOD(Initialize) (THIS_LPCITEMIDLIST pidl) PURE;
    );

The IPersistFolder interface includes the Initialize( ) function for initializing a shell folder object. In this case, the new name space is a shell folder object. The Initialize( ) function is then called (step 148). A pointer to the IShellFolder interface is obtained by calling the QueryInterface( ) function (step 150 in FIG. 17). The IShellFolder interface includes a number of functions that allow the explorer to view the objects within the added name, space and to manipulate the objects contained therein. In particular, the IShellFolder interface is defined as follows.

DECLARE_INTERFACE_(IShellFolder, IUnknown)
    (
      // * IUnknown methods *
      STDMETHOD (QueryInterface) (THIS_REFIID riid, LPVOID *ppvObj) PURE;
      STDMETHOD (ULONG, AddRef) (THIS) PURE;
      STDMETHOD_(ULONG, Release) (THIS) PURE;
      // * IShellFolder methods *
      STDMETHOD(ParseDisplayName) (THIS_HWND hwndOwner, LPBC pbcReserved, LPOLESTR lpszDisplayName,
        ULONG* pchEaten, LPITEMIDLIST * ppidl, ULONG *pdwAttributes) PURE;
      STDMETHOD(EnumObjects) (THIS_HWND hwndOwner, DWORD grfFlags, LPENUMIDLIST * ppenumIDList) PURE;
      STDMETHOD(BindToObject)   (THIS_ LPCITEMIDLIST pidl, LPBC pbcReserved, REFIID riid, LPVOID * ppvOut) PURE;
      STDMETHOD(BindToStorage)  (THIS_ LPCITEMIDLIST pidl, LPBC pbcReserved, REFIID riid, LPVOID * ppvObj) PURE;
      STDMETHOD(CompareIDs) (THIS_LPARAM lParam, LPCITEMIDLIST pidl1, LPCITEMIDLIST pidl2) PURE;
      STDMETHOD(CreateViewObject) (THIS_HWND hwndOwner, REFIID riid, LPVOID *ppvOut) PURE;
      STDMETHOD(GetAttributesOf) (THIS_UINT cidl, LPCITEMIDLIST * apidl, ULONG * rgfInOut) PURE;
      STDMETHOD(GetUIObjectOf) (THIS_HWND hwndOwner, UINT cidl, LPCITEMIDLIST * apidl, REFIID riid, UINT * prgfInOut LPVOID * ppvOut) PURE;
      STDMETHOD(GetDisplayNameOf) (This_ LPCITEMIDLIST pidl, DWORD uFlags, LPSTRRET lpName) PURE;
      STDMETHOD(SetNameOf) (This_HWND hwnd ([O?]wner, LPCITEMIDLIST pidl, LPCOLESTR lpszName, DWORD uFlags, LPITEMMIDLIST * ppidlOut) PURE;
    );

These functions are called as needed to perform the needed behavior to view and manipulate the objects of the added name space (step 152 in FIG. 17). Of particular interest to the preferred embodiment of the present invention is the CreateViewObject( ) function that creates a view object that supports the IShellView interface. Also of interest in the IShellFolder interface is the GetUIObjectOf( ) fiction that creates a UI object (e.g., an icon) to be used for specified objects. The EnumObjects( ) function is used to enumerate the objects within the new object space.

The IShellView interface is defined as follows:

DECLARE_INTERFACE_(IShellView, IOleWindow)
    (
      // * IUnknown methods *
      STDMETHOD (QueryInterface) (THIS_REFIID riid, LPVOID FAR* ppvObj) PURE;
      STDMETHOD_(ULONG, AddRef) (THIS) PURE;
      STDMETHOD_(ULONG, Release) (THIS) PURE;
      // * IOleWindow methods *
      STDMETHOD(GetWindow) (THIS_HWND FAR* lphwnd) PURE;
      STDMETHOD(ContextSensitiveHelp) (THIS_BOOL fEnterMode) PURE;

```
// *** IShellView methods ***
STDMETHOD(TranslateAccelerator) (THIS_
    LPMSG lpmsg) PURE;
STDMETHOD(EnableModeless) (THIS_BOOL
    fEnable) PURE;
STDMETHOD(UIActivate) (THIS_UINT uState)
    PURE;
STDMETHOD(Refresh) (THIS) PURE;
STDMETHOD(CreateViewWindow) (THIS_IShellView
    FAR *lpPrevView, LPCFOLDERSETTINGS lpfs, IShell-
    Browser FAR * psb, RECT FAR* prcView, HWND FAR
    *phWnd) PURE;
STDMETHOD(DestroyViewWindow) (THIS) PURE;
STDMETHOD(GetCurrentInfo) (THIS_
    LPCFOLDERSETTINGS lpfs) PURE;
STDMETHOD(ForwardControlMsg) (THIS_UINT
    id, UINT uMsg, WPARAM wParam, LPARAM
    lParam, LRESULT FAR* pret) PURE;
STDMETHOD(AddPropertySheetPages) (THIS_
    DWORD dwReserved, LPFNADDPROP-
    SHEETPAGE lpfn, LPARAM lparam) PURE;
STDMETHOD(SaveViewState) (THIS) PURE;
STDMETHOD(SelectItem) (THIS_LPCVOID lpvID,
    UINT uflags) PURE;
);
```

The shell uses the IShellView interface to display information in the second portion 138 (FIG. 15) of the explorer. The explorer calls the CreateViewWindow( ) function to allow a name space extension to create a view window for a folder. The explorer notifies state changes by calling the UIActivate( ) function.

The shell explorer/folder frame window that provides the first portion 136 of the explorer supports the IShellBrowser interface. This interface is defined as follows:

```
DECLARE INTERFACE (IShellBrowser, IOleWindow)
(
    // ***IUnknown methods ***
    STDMETHOD (QueryInterface) (THIS_REFIID riid,
        LPVOID FAR* ppvObj) PURE;
    STDMETHOD_(ULONG, AddRef) (THIS) PURE;
    STDMETHOD (ULONG, Release) (THIS) PURE;
    // *** IOleWindow methods ***
    STDMETHOD(GetWindow) (THIS_HWND FAR*
        lphwnd) PURE;
    STDMETHOD(ContextSensitiveHelp) (THIS_BOOL
        fEnterMode) PURE;
    // *** IShellBrowser methods *** (same as
        IOleInPlaceFrame)
    STDMETHOD(InsertMenus) (THIS_HMENU
        hmenuShared, LPbLEMENUGROUPWIDTHS
        lpMenuWidths) PURE;
    STDMETHOD(SetMenu) (THIS_HMENU
        hmenuShared, HOLEMENU holemenu, HWND
        hwndActiveObject) PURE;
    STDMETHOD(RemoveMenus) (THIS_HMENU
        hmenuShared) PURE;
    STDMETHOD(SetStatusText) (THIS_LPCOLESTR
        lpszStatusText) PURE;
    STDMETHOD(EnableModeless) (THIS_BOOL
        fEnable) PURE;
    STDMETHOD (TranslateAccelerator) (THIS_
        LPMSG lpmsg, WORD wID) PURE;
    // *** IShellBrowser methods ***
    STDMETHOD(BrowseObject) (THIS_LPMONIKER
        pmk, UINT wFlags) PURE;
    STDMETHOD(GetViewStateStream) (THIS_
        DWORD grfMode, LPSTREAM FAR *ppStrm)
        PURE;
    STDMETHOD(GetControlWindow) (THIS_UINT id,
        HWND FAR* lphwnd) PURE;
    STDMETHOD(SendControlMsg) (THIS_UINT id,
        UINT uMsg, WPARAM wParam, LPARAM lParam,
        LRESULT FAR* pret) PURE;
    STDMETHOD(QueryActiveShellView) (THIS_struct
        IShellView FAR** ppshv) PURE;
    STDMETHOD (OnViewWindowActive) (THIS_
        struct IShellView FAR* ppshv) PURE;
    STDMETHOD (AddViewPropertySheetPages)
        (THIS_DWORD dwReserved, LPFNADDPROP-
        SHEETPAGE lpfn, LPARAM lparam) PURE;
    STDMETHOD (SetToolbarItems) (THIS_
        LPTBBUTTON lpButtons, UINT nButtons, UINT
        uFlags) PURE;
);
```

The shell explorer/folder frame calls its CreateViewObject( ) function to create an object that supports the IShellView interface. The shell explorer/folder frame calls its CreateViewWindow function to create the first portion 136 of the explorer. A pointer to the IShellBrowser interface is passed to the view object that supports the IShellView interface as a parameter to the CreateViewWindow( ) function call.

Thus, in order to add a name space to the explorer name space, the extension handler must support the IPersistFolder and IShellFolder interfaces. In addition, each object in the new name space must support the IShellView interface. The Shell/Explorer folder frame must support the IBrowser interface.

Figure 18:
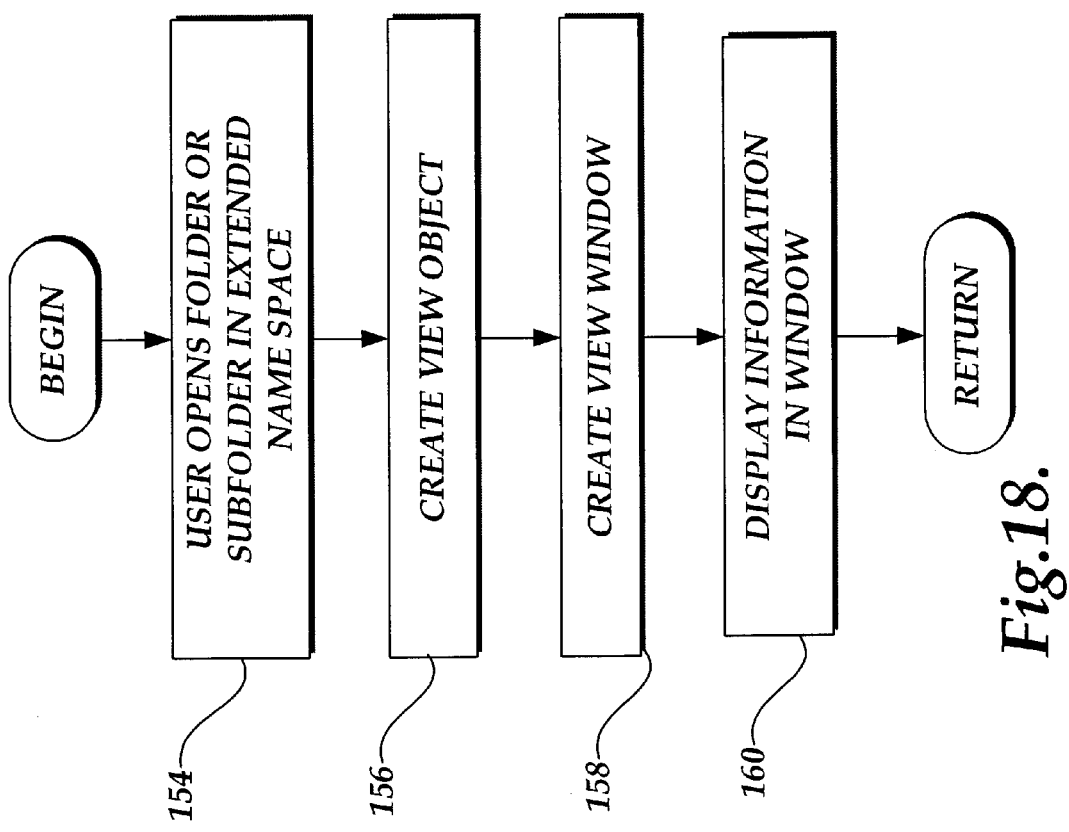
FIG. 18 is a flow chart showing the steps that are performed to display the contents of objects in a newly added name space in the preferred embodiment of the present invention.

FIG. 18 is a flowchart illustrating the steps that are performed when the user opens a shell folder for an extended name space or one of the subfolders contained within the shell folder for the extended name space. Initially, the user opens the folder or subfolder in tile extended name space (step 154 in FIG. 18). The folder or subfolder is typically displayed in the first area 136 (FIG. 15) of the explorer window 134 Tile folder or subfolder is opened by double clicking on the folder or subfolder with the mouse 14 or by selecting an open option from the file menu. A view object is then created by calling the CreateViewObject( ) within the IShellFolder interface (step 156 in FIG. 18). The view object knows how to display the contents of the folder or subfolder. A view window for the folder or subfolder is then created by calling the CreateViewWindow( ) function to create a view window for the folder or subfolder. The view object then displays information in the view window, as dictated by the folder or subfolder. Thus, for example, the contents of the folder or subfolder may he shown in a second portion 138 of the explorer window 134 (FIG. 15).

The approach of the preferred embodiment of the present invention differs greatly from approaches adopted by conventional operating systems. In conventional operating systems, the shell is typically responsible for displaying any information about file system objects within a file manager. In the preferred embodiment of the present invention, in contrast, the objects are responsible for displaying their contents within the explorer. For example, each folder and subfolder within an extended name space is responsible for displaying its contents when opened using the explorer. This allows users to easily discern the contents of such folders and subfolders.

While the present invention has been described with reference to a preferred embodiment thereof, those skilled in the art will appreciate that variations in form and detail may be made without departing from the intended scope of the present invention as defined in the appended claims.

The shell extensions of the preferred embodiment of the present invention are described in more detail in the attached appendix.

Shell Extensions

About Shell Extensions

In the Microsoft Windows 95 operating system, applications can extend the shell in a number of ways. A *shell extension* enhances the shell by providing additional ways to manipulate file objects, by simplifying the task of browsing through the file system and networks, or by giving the user easier access to tools that manipulate objects in the file system. For example, a shell extension can assign an icon to each file or add commands to the context menu and file menu for a file.

Windows 95 supports the following types of shell extensions:

- Context menu handlers: These add items to the context menu for a particular file object. (The context menu is displayed when the user clicks a file object with the right mouse button.)

- Drag-and-drop handlers: These are context menu handlers that the system calls when the user drops an object after dragging it to a new position.

- Icon handlers: These typically add instance-specific icons for file objects. They can also be used to add icons for all files belonging to the same class.

- Property-sheet handlers: These add pages to the property sheet dialog box that the shell displays for a file object. The pages are specific to a class of files or a particular file object.

- Copy-hook handlers: These are called when a folder object is about to be copied, moved, deleted, or renamed. The handler can either allow or prevent the operation.

The design of a shell extension is based on the Component Object Model in Object Linking and Embedding (OLE) version 2.0. The shell accesses an object through interfaces. An application implements the interfaces in a shell extension dynamic-link library (DLL), which is similar to an In-Process Server DLL in OLE 2.0.

This <topic><article> explains how to create shell extensions and describes how the shell interacts with them.

27

Terms

You should be familiar with the following terms before proceeding:

*file object*
　A file object is an item within the shell. The most familiar file objects are files and directories. However, a file object may not actually be a part of the file system—it may only appear that way. For example, printers, Control Panel applications, and network shares, servers, and workgroups are also considered to be file objects.

*file class*
　Each file object is a member of a file class. The file class refers to the code that "owns" the manipulation of files of that class. For example, text files and Microsoft Word documents are examples of file classes. Each file class has specific shell extensions associated with it. When the shell is about to take an action involving a file object, it uses the file class to determine the extensions to load.

*handler*
　A handler is the code that implements a particular shell extension.

Registry Entries for a Shell Extension

A shell extension must be registered in the Windows registry. The class identifier of each handler must be registered under the HKEY_CLASSES_ROOT\CLSID key. The CLSID key contains a list of class identifier key values such as {00030000-0000-0000-C000-000000000046}. Each class identifier key is a globally unique identifier (GUIDs) generated with the UUIDGEN tool. Within each class identifier key, the handler adds an InProcServer32 key that gives the location of the handler's dynamic-link library (DLL). It is best to give the complete path for the handler; using the complete path keeps the handler independent of the current path and speeds up the load time for the DLL.

An application that creates and maintains files, such as a spreadsheet, word processor, or database application, usually registers two additional entries in the registry: a file association entry and a key name. The file association entry maps a file extension to an application identifier. For example, a word-processing application might register the following key under HKEY_CLASSES_ROOT:

HKEY_CLASSES_ROOT
　.doc=AWordProcessor

The key name (.doc) specifies the file extension, and the value of the key (AWordProcessor) denotes the key name that contains the information about the application that handles the file extension. The value of the key name is the second registry entry made by an application that handles files.

HKEY_CLASSES_ROOT $\mathscr{QS}$

```
AWordProcessor = A Word Processor
  shell
    open
      command = c:\aword\aword.exe %1
    print
      command = c:\aword\aword.exe %1
    printTo
      command = c:\aword\aword.exe %1 %2
    preview = Preview
      command = c:\aword\aword.exe /c %1
  shellex
    ContextMenuHandlers = ExtraMenu
      ExtraMenu = {00000000-1111-2222-3333-000000000001}
    PropertySheetHandlers = SummaryInfo
      SummaryInfo = {00000000-1111-2222-3333-000000000002}
    IconHandler = {00000000-1111-2222-3333-000000000003}
```

The commands in the shell section of the registry are added to the context menus of the corresponding files. The printTo command is also used when the user drops a document onto a printer.

To avoid conflicts with other classes, you must use real GUIDs, not the sample strings shown in the previous example.

The information that the shell uses to associate a shell extension handler with a file type is stored under the shellex key. The shell also uses several other special keys— *, Folder, Drives, Printers, and keys for network providers—under HKEY_CLASSES_ROOT to look for shell extensions:

◆ You can use the * key to register handlers that the shell calls whenever it creates a context menu or property sheet for a file object. For example:

```
HKEY_CLASSES_ROOT
  * = *
    shellex
      ContextMenuHandlers = ExtraMenu
        ExtraMenu = {00000000-1111-2222-3333-000000000001}
      PropertySheetHandlers = SummaryInfo
        SummaryInfo = {00000000-1111-2222-3333-000000000002}
```

The shell uses instances of the ExtraMenu and SummaryInfo handlers to add to the context menus and property sheets for every file object.

◆ You can use the the Folder key to register a shell extension for directories in the file system. You can register context-menu handlers, copy-hook handlers, and property-sheet handlers in the same way you register these handlers for the * key. An additional handler, the drag-drop handler, applies only to the Folder and Printers keys. For example:

```
Folder = Folder
  shellex
```

*29*

```
DragDropHandlers = ADDHandler
    ADDHandler = {00000000-1111-2222-3333-000000000004}
CopyHookHandlers = ACopyHandler
    ACopyHandler = {00000000-1111-2222-3333-000000000005}
```

- You can use the Drives key for the same registrations as the Folder key, but the Drives key is called only for root paths, for example, C:\.
- The Printers key allows the same registrations as the Folder key, but uses additional handlers for printer events, deletion or removal of printers (through the copy-hook handler), and printer properties (with property-sheet handlers and context-menu handlers).

How the Shell Accesses Shell Extension Handlers

The shell uses two interfaces to initialize instances (objects created by IClassFactory::CreateInstance) of shell extensions: IShellExtInit and IPersistFile. The shell uses the IShellExtInit interface to initialize instances of context-menu handlers, drag-drop handlers, and property-sheet handlers. The shell uses IPersistFile to initialize instances of icon handlers. This interface is same as the IPersistFile interface in OLE 2.0.

The IShellExtInit interface adds one member function, Initialize, to the standard IUnknown interface. A handler's Initialize function should keep a copy of the parameters that the shell passes to the function for use later. For example:

```
STDMETHODIMP SHE_ShellExtInit_Initialize(LPSHELLEXTINIT psxi,
    LPCITEMIDLIST pidlFolder, LPDATAOBJECT pdtobj, HKEY hkeyProgID)
{
    PSHELLEXTSAMPLE this = PSXI2PSMX(psxi);

// Initialize can be called more than once.
    if (this->_pdtobj) {
        this->_pdtobj->lpVtbl->Release(this->_pdtobj);
    } if (this->_hkeyProgID) {
        RegCloseKey(this->_hkeyProgID);
    }

// Duplicate the pdtobj pointer, then update the usage count.
    if (pdtobj) {
        this->_pdtobj = pdtobj;
        pdtobj->lpVtbl->AddRef(pdtobj);
    }

// Duplicate the registry handle.
    if (hkeyProgID) {
        RegOpenKey(hkeyProgID, NULL, &this->_hkeyProgID);
    }
```

30

```
    return NOERROR;
}
```

A shell extension handler must implement three functions: an entry point (often called DllMain or LibMain), DllCanUnloadNow, and DllGetClassObject. The entry point is standard for any 32-bit DLL; it usually saves the handle to the DLL for future use. The handle must be stored in a per-instance variable. The following example shows a typical entry point for a handler:

```
BOOL APIENTRY LibMain(HANDLE hDll, DWORD dwReason, LPVOID lpReserved)
{
    switch(dwReason) {
        case DLL_PROCESS_ATTACH:
            g_hmodThisDll = hDll;   // must be per-instance.
            break;

case DLL_PROCESS_DETACH:
        case DLL_THREAD_DETACH:
        case DLL_THREAD_ATTACH:
            break;

default:
            break;
    }
    return TRUE;
}
```

The DllCanUnloadNow and DllGetClassObject functions are essentially the same as they would be for any In-Proc Server DLL in OLE 2.0. DllCanUnloadNow is straightforward:

```
STDAPI DllCanUnloadNow(void)
{
    // g_cRefThisDll must be placed in the per-instance data section.
    return ResultFromScode((g_cRefThisDll==0) ? S_OK : S_FALSE);
}
```

DllGetClassObject needs to expose the class factory for the object in the DLL. For more information on exposing the class factory, see the OLE 2.0 Programmer's Reference. The following example shows how to expose the class factory:

```
extern CDefClassFactory * NEAR PASCAL CDefClassFactory_Create(
    LPFNCREATEINSTANCE lpfnCI, UINT FAR * pcRefDll, REFIID riidInst);

// DllGetClassObject - DLL entry point used by most In-Proc Server DLLs.

STDAPI DllGetClassObject(REFCLSID rclsid, REFIID riid, LPVOID FAR*
ppvOut)
{
```

*3/* 35

```
*ppvOut = NULL; // Assume failure if (IsEqualIID(rclsid, &CLSID_ShellExtSample)) {
    if (IsEqualIID(riid, &IID_IClassFactory))
        || IsEqualIID(riid, &IID_IUnknown)) {
        CDefClassFactory * pacf = CDefClassFactory_Create(
            ShellExtSample_CreateInstance, &g_cRefThisDll,
            NULL);
        if (pacf) {
            (IClassFactory FAR *)*ppvOut = &pacf->cf;
            return NOERROR;
        }
        return ResultFromScode(E_OUTOFMEMORY);
    }
    return ResultFromScode(E_NOINTERFACE);
} else {
    return ResultFromScode(CLASS_E_CLASSNOTAVAILABLE);
}
}
```

Item Identifiers and Identifier Lists

The Windows 95 shell provides an object called an *item identifier* (item ID), which is a variable-length byte stream that contains information for identifying a file object within a folder. An item ID contains only persistent values such as pointers to data structures, window handles, or atoms. This is because the shell may store an item ID in persistent storage (that is, on disk) and use it later. The Windows header files define an item ID as follows:

```
typedef struct _SHITEMID {
    USHORT cb;      // size, in bytes, of the item ID
    BYTE   abID[1]; // item ID (variable length)
} SHITEMID, FAR* LPSHITEMID;

typedef const SHITEMID FAR * LPCSHITEMID;
```

An item ID may also contain information that helps improve the efficiency with which you can manipulate the file object. For example, an item ID might contain the file object's display name or data used for sorting the object.

The shell uses only the first two bytes of an item ID, which specify the ID's size. The remaining data in an item ID is used only by the handler that created the ID.

The shell often concatenates item IDs and appends a terminating NULL character, creating an item ID list. A simple item ID list contains only one item ID; a complex item ID list contains multiple item IDs. For consistency, the shell always passes the address of an item ID list to a handler even when the handler can only use a single item ID. The Windows header files define an item ID list as follows:

32

```
typedef struct _ITEMIDLIST { // idl
    SHITEMID mkid;
} ITEMIDLIST, FAR* LPITEMIDLIST;

typedef const ITEMIDLIST FAR* LPCITEMIDLIST;
```

Context Menu Handlers

A *context menu handler* is a shell extension that adds menu items to any of the shell's context menus. There are two types of context menu handlers, which have different purposes but the same implementation: *context menu extensions* are used when the user right clicks on a file object; *drag-drop handlers* are used when the user drags a file object using the right mouse button. This <section> describes the types of context menu handlers, how they are used, how they are added to the registry, and the interfaces they must implement.

Context Menu Extensions

When the user clicks the right mouse button on an item within the shell's name space (e.g., file, directory, server, work-group, etc.), it creates the default context menu for its type, then loads context menu extensions that are registered for that type (and its base type) so that they can add extra menu items. Those context menu extensions are registered at the following location:

HKCR\{ProgID}\shellex\ContextMenuHandlers

The IContextMenu Interface

An application implements a context-menu handler interface, IContextMenu, to add menu items to the context menu for a file object. The shell displays the object's context menu when the user clicks the object with the right mouse button. The menu items can be either class-specific (that is, applicable to all files of a particular type) or instance-specific (that is applicable to an individual file).

When the user right-clicks a file object, the system passes the address of the object's context menu to the context-menu handler, which should use the handle only to add items to the menu. Your handler should not delete or modify existing menu items because other handlers may add items either before or after yours does. In addition, the shell adds items to the menu after all context-menu handlers have been called.

Context-menu handlers are entered in the registry under the shellex key within an application's information area. The ContextMenuHandlers key lists the names of subkeys that contain the CLSID of each context-menu handler, for example:

```
ContextMenuHandlers = ExtraMenu
    ExtraMenu = {00000000-1111-2222-3333-000000000001}
```

*33*

You can register multiple context-menu handlers for a file type. In this case, the order of the subkey names in the ContextMenuHandlers key determines the order of the context menu's items.

In addition to the standard IUnknown member functions, the context-menu handler interface uses three member functions:

- QueryContextMenu
- InvokeCommand
- GetCommandString

When the user selects one of the menu items added by a context-menu handler, the shell calls the handler's IContextMenu::InvokeCommand member function to let the handler process the command. If you register multiple context-menu handlers for a file type, the value of the ContextMenuHandlers key determines the order of the commands.

When the system is about to display a context menu for a file object, the system calls the context-menu handler's QueryContextMenu member function. The context-menu handler inserts menu items by position (MF_POSITION) directly into the context menu by calling the InsertMenu function. Menu items must be string items (MF_STRING), as the following example demonstrates:

```
STDMETHODIMP SHE_ContextMenu_QueryContextMenu(LPCONTEXTMENU pctm,
    HMENU hmenu, UINT indexMenu, UINT idCmdFirst, UINT idCmdLast,
    UINT uFlags)
{
    UINT idCmd = idCmdFirst;

if (idCmdFirst+2 > idCmdLast)
        return ResultFromScode(E_FAIL);

InsertMenu(hmenu, indexMenu++, MF_STRING | MF_BYPOSITION,
        idCmd++, "Check H&DROP (menuext)");
    InsertMenu(hmenu, indexMenu++, MF_STRING | MF_BYPOSITION,
        idCmd++, "Check H&NRES (menuext)");
    return ResultFromScode(MAKE_SCODE(SEVERITY_SUCCESS, FACILITY_NULL,
        (USHORT) 2));
}
```

The system calls the InvokeCommand member function when the user selects a menu item that the context-menu handler added to the context menu. The InvokeCommand function in the following example handles the commands associated with the menu items added by the previous example:

```
STDMETHODIMP SHE_ContextMenu_InvokeCommand(LPCONTEXTMENU pctm,
    HWND hwnd, LPCSTR pszWorkingDir, LPCSTR pszCmd, LPCSTR pszParam,
    int iShowCmd)
{
```

*34*

```
PSHELLEXTSAMPLE this = PCTM2PSMX(pctm);
HRESULT hres = ResultFromScode(E_INVALIDARG);    // assume error // No need to support string-based command.
if (!HIWORD(pszCmd)) {
    UINT idCmd = LOWORD(pszCmd);

switch(idCmd) {
        case IDM_HDROP:
            hres = DoHDROPCommand(hwnd, pszWorkingDir, pszCmd,
                    pszParam, iShowCmd);
            break;

case IDM_HNRES:
            hres = DoHNRESCommand(hwnd, pszWorkingDir, pszCmd,
                    pszParam, iShowCmd);
            break;
    }
}
return hres;
}
```

Windows calls the GetCommandString member function to get a language-independent command string or the help text for a context menu item.

Drag-Drop Handlers

Drag-drop handlers implement the IContextMenu interface. In fact, a drag-drop handler is simply a context-menu handler that affects the menu the shell displays when a user drags and drops a file object with the right mouse button. Since this menu is called the drag-drop menu, shell extensions that add items to this menu are called drag-drop handlers. Drag-drop handlers work in the same way as context-menu handlers.

Copy Hook Handlers

A *copy-hook handler* is a shell extension that the shell calls before moving, copying, deleting, or renaming a folder object. The copy-hook handler does not perform the task itself, but provides approval for the task. When the shell receives approval from the copy-hook handler, it performs the actual file system operation (move, copy, delete, or rename). Copy-hook handlers are not informed about the success of the operation, so they cannot monitor actions that occur to folder objects.

The shell initializes the copy-hook handler interface directly, that is, without using an IShellExtInit or IPersistFile interface first. A folder object can have multiple copy-hook handlers. The copy-hook handler interface has one member function, CopyCallBack, in addition to the standard IUnknown member functions.

35

The shell calls the CopyCallBack member function before it copies, moves, renames, or deletes a folder object. The function returns an integer value that indicates whether the shell should perform the operation. The shell will call each copy-hook handler registered for a folder object until either all the handlers have been called, or any handler returns IDCANCEL. The handler can also return IDYES to specify that the operation should be carried out, or IDNO to specify that the operation should not be performed.

Icon Handlers

An application can use the shell's icon interface to customize the icons that the shell displays for the application's file types. The icon interface also allows an application to specify icons for folders and subfolders within the application's file structure.

An application can specify icons for its file types in two ways. The simplest way is to specify a class icon to be used for all files of a particular file type by adding a DefaultIcon key to the registry under the program information. The value of this key specifies the executable (or DLL) that contains the icon, and the index of the icon with the file. For example:

```
DefaultIcon = c:\Mydir\Myapp.exe,1
```

One of the advantages of using a class icon is that it requires no programming; the shell handles displaying the icon for the class.

Windows 95 adds a new value, %1, for the DefaultIcon key. This value denotes that each file instance of this type can have a different icon. The application must supply an icon handler for the file type and add another entry, IconHandler, to the shellex key for the application. An application can have only one IconHandler entry. The value of the IconHandler key denotes the CLSID of the icon handler, for example:

```
shellex
    IconHandler = {00000000-1111-2222-3333-000000000003}
DefaultIcon = %1
```

To have customized icons, an application must provide an icon handler that implements the IExtractIcon interface. The system takes the following steps when it is about to display an icon for a file type that has instance-specific icons:

1. Retrieves the class identifier of the handler.
2. Creates an IClassFactory object by calling the DllGetClassObject entry of the specified DLL.
3. Calls IClassFactory::CreateInstance with IID_IPersistFile to create its instance.
4. Initializes the instance by calling the IPersistFile::Load member function.

36

5. Uses the QueryInterface member function to get to the IExtractIcon interface.
6. Calls the IExtractIcon interface's GetIconLocation and ExtractIcon member functions.

The IExtractIcon interface has two member functions in addition to the usual IUnknown member functions:

◆ GetIconLocation
◆ ExtractIcon

The system calls the GetIconLocation member function to get the location of an icon to display. Typically, the icon location is an executable or DLL filename, but it can be any file. The following example saves the filename passed to the Load member function of IPersistFile, and tells the shell where to find the icon to display:

```
STDMETHODIMP SHE_PersistFile_Load(LPPERSISTFILE pPersistFile,
    LPCOLESTR lpszFileName, DWORD grfMode)
{
    // Get a pointer to my class
    PSHELLEXTSAMPLE this = PPSF2PSMX(pPersistFile);

int iRet = WideCharToMultiByte(CP_ACP, WC_SEPCHARS, lpszFileName,
        -1, this->_szFile, sizeof(this->_szFile), NULL, NULL);

// Copy the filename to a buffer.
    if (iRet==0) {
        LPSTR psz=this->_szFile;
        while(*psz++ = (char)*lpszFileName++);
    } return NOERROR;
}

STDMETHODIMP SHE_ExtractIcon_GetIconLocation(LPEXTRACTICON pexic,
    UINT uFlags, LPSTR szIconFile, UINT cchMax, int FAR * piIndex,
    UINT FAR * pwFlags)
{
    PSHELLEXTSAMPLE this = PEXI2PSMX(pexic);
    if (this->_szFile[0]) {
        GetPrivateProfileString("IconImage", "FileName",
            "shell32.dll",szIconFile, cchMax, this->_szFile);
        *piIndex = (int) GetPrivateProfileInt("IconImage", "Index",
            0, this->_szFile);
    } else {
        lstrcpy(szIconFile, "shell32.dll");
        *piIndex = -10;
    }
    *pwFlags = 0;
```

37

```
return NOERROR;
}
```

The system calls the ExtractIcon member function when it needs to display an icon for a file that does not reside in an executable or DLL. Applications usually have the file icons in their executables or DLLs, so icon handlers can simply implement this member function as a return-only function that returns E_FAIL. When the icon for a file is in a separate .ICO file (or any other type of file), the icon handler must extract the icon for the shell and return it in this member function.

Property Sheet Handlers

Another way the shell can be extended is by custom property sheets. When the user selects the properties for a file, the shell displays a standard property sheet. If the registered file type has a property-sheet handler, the shell will allow the user to access additional sheets that the handler provides. Property-sheet handlers implement the IShellPropSheetExt interface.

Property-sheet handlers are entered in the registry under the shellex key, within an application's information area. The PropertySheetHandlers key lists the names of subkeys that contain the class identifier of each context-menu handler. For example:

```
PropertySheetHandlers = SummaryInfo
    SummaryInfo = {00000000-1111-2222-3333-000000000002}
```

You can register multiple property-sheet handlers for a file type. In this case, the order of the subkey names in the PropertySheetHandlers key determines the order of the additional property sheets. You can use a maximum of 24 (the value of MAXPROPPAGES) pages in a property sheet.

Adding Property Sheet Pages

The property-sheet handler uses the AddPages member function in addition to the usual IUnknown member functions. The system calls the AddPages member function when it is about to display a property sheet. The system calls each property-sheet handler registered to the file type to allow the handlers to add pages to the property sheets. The following example shows how to implement the AddPages member function.

```
STDMETHODIMP CSamplePageExt::AddPages(LPFNADD... ''HEETPAGE lpfnAddPage,
    LPARAM lParam)
{
    PROPSHEETPAGE psp;
    HPROPSHEETPAGE hpage;

psp.dwSize     = sizeof(psp);    // no extra data.
    psp.dwFlags    = PSP_USEREFPARENT | PSP_USERELEASEFUNC;
    psp.hInstance  = (HINSTANCE)g_hmodThisDll;
```

*38*

```
psp.pszTemplate  = MAKEINTRESOURCE(DLG_FSPAGE);
psp.pfnDlgProc   = FSPage_DlgProc;
psp.pcRefParent  = &g_cRefThisDll;
psp.pfnRelease   = FSPage_ReleasePage;
psp.lParam       = (LPARAM)hdrop;

hpage = CreatePropertySheetPage(&psp);
if (hpage) {
    if (!lpfnAddPage(hpage, lParam))
        DestroyPropertySheetPage(hpage);
}
return NOERROR;
}
```

Replacing Control Panel Pages

The ReplacePage member function is called only by control panels. It allows you to replace the property sheet of a standard control panel with a custom page. For example, if a mouse manufacturer adds extra buttons to it's mouse, the manufacturer can replace the standard mouse control panel's "Buttons" property sheet page. The ReplacePage member function is not called by the shell because the shell does not have any property sheet pages that can be replaced by a shell extension. Currently, only control panels call this member function, but other property sheet suppliers could use this member function to allow their property sheet pages to be replaced.

Each property sheet handler that allows a property sheet page to be replaced must specify the registry location where other handlers that replace pages must register themselves. For the standard control panel applications, this location is defined by the REGSTR_PATH_CONTROLSFOLDER macro in the REGSTR.H file. The macro defines the key under the HKEY_LOCAL_MACHINE key in which all control panel property sheet page replacement handlers must register. For example, a property sheet handler that needs to replace a property sheet page for the mouse control panel would register a property sheet extension handler in the following registry location:

```
HKEY_LOCAL_MACHINE
   REGSTR_PATH_CONTROLSFOLDER
      Mouse
         shellex
            PropertySheetHandlers = NewMousePage
   ...
      NewMousePage = {00000000-1111-2222-3333-000000000002}
```

In addition, a property sheet handler that allows replaceable pages must define identifiers for each page that can be replaced.

The standard control panels define this location in the REGSTR.H file and CPLEXT.H files. In REGSTR.H, the macro REGSTR_PATH_CONTROLSFOLDER defines the key under the HKEY_LOCAL_MACHINE key in which all control panel property sheet page replacement handlers must register. CPLEXT.H defines the subkey for each control panel that contains a replaceable property sheet page. The subkey is \Mouse for a mouse control panel application, and \Keyboard for a keyboard control panel application.

The standard control panel applications s define these in CPLEXT.H. For example CPLPAGE_MOUSE_BUTTONS defines the identifier for the mouse control panel's buttons page, and CPLPAGE_KEYBOARD_SPEED defines the identifier for the keyboard control panel's speed page.

Reference

Context Menu Interfaces and Members

IContextMenu

Interface that enables the shell to retrieve extensions to context menus. The IContextMenu interface has the following member functions:

| | |
|---|---|
| QueryContextMenu | Adds commands to a context menu. |
| InvokeCommand | Carries out a menu command, either in response to user input or otherwise. |
| GetCommandString | Retrieves the language-independent name of a menu command, or the help text for a menu command. |

Like all OLE interfaces, IContextMenu also includes the QueryInterface, AddRef, and Release member functions.

IContextMenu::QueryContextMenu

```
HRESULT STDMETHODCALLTYPE IContextMenu::QueryContextMenu(
    LPCONTEXTMENU pIface, HMENU hmenu, UINT indexMenu,
    UINT idCmdFirst, UINT idCmdLast, UINT uFlags
);
```

Adds menu items to the specified menu. The menu items should be inserted at a specified position in the menu, and their menu item identifiers must be in a specified range.

♦ Returns an HRESULT in which, if successful, the code field contains the menu-identifier offset of the last menu item added.

*pIface*
　　Address of the IContextMenu interface. In C++, this parameter is implicit.

*40*

*hmenu*
    Handle of the menu. The handler should specifying this handle when calling the InsertMenu or InsertMenuItem function.

*indexMenu*
    Zero-based position at which to insert the first menu item.

*idCmdFirst* and *idCmdLast*
    Minimum and maximum values that the handler can specify for menu item identifiers. The actual identifier of each menu item should be *idCmdFirst* plus a menu-identifier offset in the range 0 through (*idCmdLast–idCmdFirst*).

*uFlags*
    Value specifying zero or more of the following flags:

| | |
|---|---|
| CMF_DEFAULTONLY | Specifies that the user is invoking the default action, typically by double-clicking. A context menu extension or drag-drop handler should not add any menu items if this flag is specified. A name-space extension should add only the default item, if any. |
| CMF_VERBSONLY | Context menu handlers should ignore this flag. This flag is specified if the context menu is for a shortcut object. |
| CMF_EXPLORER | Context menu handlers should ignore this flag. This flag is specified if the context menu is for an object in the left pane of the explorer. |

The remaining bits of the low-order word are reserved by the system. The high-order word may be used for context-specific communications.

IContextMenu::InvokeCommand

```
HRESULT STDMETHODCALLTYPE IContextMenu::InvokeCommand(
    LPCONTEXTMENU pIface, LPCMINVOKECOMMANDINFO lpici);
```

Carries out the command associated with a context menu item.

◆ Returns NOERROR if successful, an OLE-defined error code otherwise.

*pIface*
    Address of the IContextMenu interface. In C++, this parameter is implicit.

*lpici*
    Address of a CMINVOKECOMMANDINFO structure containing information about the command.

The shell calls this member function when the user chooses a command that the handler added to a context menu. This member function may also be called programmatically, without any corresponding user action.

*41*

IContextMenu::GetCommandString

```
HRESULT STDMETHODCALLTYPE IContextMenu::GetCommandString(
    LPCONTEXTMENU pIface, UINT idCmd, UINT uType,
    UINT *pwReserved, LPSTR pszName, UINT cchMax);
```

Retrieves the language-independent command name of a menu item or the help text for a menu item.

◆ Returns NOERROR if successful, an OLE-defined error code otherwise.

*pIface*
    Address of the IContextMenu interface. In C++, this parameter is implicit.

*idCmd*
    Menu-item identifier offset.

*uFlags*
    Value specifying the information to retrieve. Can be one of these values:

| | |
|---|---|
| GCS_VERB | Return the language-independent command name for the menu item. |
| GCS_HELPTEXT | Return the help text for the menu item. |

*pwReserved*
    Reserved. Applications must specify NULL when calling this member function; handles must ignore this parameter when called.

*pszName* and *cchMax*
    Address and size of the buffer that receives the null-terminated string.

The language-independent command name is a name that can be passed to the IContextMenu::InvokeCommand member function to invoke a command programmatically. The help text is a description that the Explorer displays in its status bar, and should be reasonably short (under 40 characters).

Copy Hook Interfaces and Members

ICopyHook

Interface that allows a copy hook handler to prevent a folder or printer object from being copied, moved, deleted, or renamed. The shell calls a copy hook handler whenever file system directories are about to be copied, moved, deleted, or renamed, as well as when the status of a printer is about to change.

42

The shell initializes the copy-hook handler interface directly, that is, without using the IShellExtInit interface first. A folder object can have multiple copy-hook handlers. A copy-hook handler interface has one member function, CopyCallBack, in addition to the standard QueryInterface, AddRef, and Release member functions.

ICopyHook::CopyCallback

```
HRESULT STDMETHODCALLTYPE CopyCallback(ICopyHook FAR * pCopyHook,
    HWND hwnd, UINT wFunc, UINT wFlags, LPCSTR pszSrcFile,
    DWORD dwSrcAttribs, LPCSTR pszDestFile, DWORD dwDestAttribs);
```

Either allows the shell to carry out a copy, move, rename, or delete operation on a folder object, or prevents the shell from carrying out the operation. The shell calls each copy-hook handler registered for a folder object until either all the handlers have been called, or any handler returns IDCANCEL.

◆ Returns an integer value that indicates whether the shell should perform the operation. It can be one of these values:

| Value | Meaning |
|---|---|
| IDYES | Allow the operation |
| IDNO | Prevent the operation on this file, but continue with any other operations (for example, a batch copy operation) |
| IDCANCEL | Prevent the current operation and cancel any pending operations |

*pCopyHook*
    Address of the ICopyHook interface. In C++, this parameter is implicit.
*hwnd*
    Handle of the window that the copy-hook handler should use as the parent window for any user interface elements the handler may need to display. The member function should ignore this parameter if FOF_SILENT is specified.
*wFunc*
    Operation to perform. Can be one of the following values:

| Value | Meaning |
|---|---|
| FO_DELETE | Delete the file specified by *pszSrcFile*. |
| FO_RENAME | Rename the file specified by *pszSrcFile*. |
| FO_MOVE | Move the file specified by *pszSrcFile* to the location specified by *pszDestFile*. |
| FO_COPY | Copy the file specified by *pszSrcFile* to the location specified by *pszDestFile*. |
| PO_DELETE | Delete the printer specified by *pszSrcFile*. |
| PO_RENAME | Rename the printer specified by *pszSrcFile*. |

*43*

| | | |
|---|---|---|
| PO_PORTCHANGE | | Change the printer port. The *pszSrcFile* and *pszDestFile* parameters contain double null-terminated lists of strings. Each list contains the printer name followed by the port name. The port name in *pszSrcFile* is the current printer port; the port name in *pszDestFile* is the new printer port. |
| PO_REN_PORT | | Combination of PO_RENAME and PO_PORTCHANGE. |

*wFlags*

Flags that control the operation. Can be a combination of the following values:

| Value | Meaning |
|---|---|
| FOF_ALLOWUNDO | Preserve undo information, if possible. |
| FOF_CONFIRMMOUSE | Not implemented. |
| FOF_FILESONLY | Not implemented. The shell calls a copy hook handler only for folder objects, not files. |
| FOF_MULTIDESTFILES | The SHFileOperation function specified multiple destination files (one for each source file) rather than one directory where all the source files are to be deposited. A copy-hook handler typically ignores this flag. |
| FOF_NOCONFIRMATION | Respond with "yes to all" for any dialog box that is displayed. |
| FOF_NOCONFIRMMKDIR | If the operation requires a new directory to be created, do not confirm the creation. to create any needed directories. |
| FOF_RENAMEONCOLLISION | In a move, copy, or rename operation, if a file of the target name already exists, give the file being operated on a new name (such as "Copy #1 of..."). |
| FOF_SILENT | Do not display a progress dialog box. |
| FOF_SIMPLEPROGRESS | Display a progress dialog box, but the dialog box does not show the names of the files. |

*pszSrcFile*

Address of a string that contains the name of the source file.

*dwSrcAttribs*

Attributes of the source file. Can be a combination of any of the file attribute flags (FILE_ATTRIBUTE_*) defined in the Windows header files.

*pszDestFile*

Address of a string that contains the name of the destination file.

*dwDestAttribs*

Attributes of the source file. Can be a combination of any of the file attribute flags (FILE_ATTRIBUTE_*) defined in the Windows header files.

44

Icon Interfaces and Members

IExtractIcon

Interface that enables the shell to retrieve icons for file objects or folders. The IExtractIcon interface has the following member functions:

GetIconLocation        Retrieves the icon location for a file object.
ExtractIcon             Extracts an icon from the specified location.

Like all OLE interfaces, IExtractIcon also includes the QueryInterface, AddRef, and Release member functions.

IExtractIcon::GetIconLocation

```
HRESULT STDMETHODCALLTYPE IExtractIcon::GetIconLocation(
    LPEXTRACTICON pIface, UINT uFlags, LPSTR szIconFile,
    UINT cchMax, int *piIndex, UINT *pwFlags
);
```

Retrieves the location and index of an icon.

♦ Returns NOERROR if the function returned a valid location, S_FALSE if the shell should use a default icon.

*pIface*
    Address of the IExtractIcon interface. In C++, this parameter is implicit.
*uFlags*
    Flags. Can be zero or the following value:

GIL_OPENICON      Specifies that the icon is for a folder that is open.

*szIconFile* and *cchMax*
    Address and size of the buffer that receives the icon location. The icon location is a null-terminated string that typically specifies the name of an icon file.
*piIndex*
    Address of an integer that receives the icon index.
*pwFlags*
    Address of an unsigned integer that receives zero or more of these values:

GIL_SIMULATEDOC      Specifies that the shell should create a document icon using the specified icon.
    GIL_PERINSTANCE      Specifies that each file object of this class has its own icon.

| | |
|---|---|
| GIL_PERCLASS | Specifies that all file objects of this class have the same icon. |

IExtractIcon::ExtractIcon

```
HRESULT STDMETHODCALLTYPE IExtractIcon::ExtractIcon(
    LPEXTRACTICON pIface, LPCSTR pszFile, UINT nIconIndex,
    HICON *phiconLarge, HICON *phiconSmall, UINT nIconSize
);
```

Extracts an icon image from the specified location.

♦ Returns NOERROR if the function extracted the icon, S_FALSE if the caller should extract the icon.

*pIface*
    Address of the IExtractIcon interface. In C++, this parameter is implicit.

*pszFile*
    Address of a null-terminated string specifying the icon location.

*nIconIndex*
    Icon index.

*phiconLarge* and *phiconSmall*
    Addresses of variables that receive the handles of the large and small icons, respectively.

*nIconSize*
    Value specifying size (width or height) of the large icon required, in pixels. The width of an icon always equals its height.

The icon location and index are the same values returned by the IExtractIcon::GetIconLocation member function. If this function returns S_FALSE, these values must specify an icon filename and index. If this function does *not* return S_FALSE, the caller should make no assumptions about the meanings of the *pszFile* and *nIconIndex* parameters.

Property Sheet Interfaces and Members

IShellPropSheetExt

Interface that allows a property sheet hander to add or replace pages in the property sheet for a file object. The IShellPropSheetExt interface has the following member functions:

| | |
|---|---|
| AddPages | Adds one or more pages to a property sheet for a file object. |
| ReplacePage | Replaces a page in a property sheet for a control panel object. |

46

Like all OLE interfaces, IShellPropSheetExt also includes the QueryInterface, AddRef, and Release member functions.

IShellPropSheetExt::AddPages

```
HRESULT STDMETHODCALLTYPE AddPages(IShellPropSheetExt FAR * pProp,
    LPFNADDPROPSHEETPAGE lpfnAddPage, LPARAM lParam);
```

Adds one or more pages to a property sheet that the shell displays for a file object. When it is about to display the property sheet, the shell calls the AddPages member function of each property sheet handler registered to the file type.

◆ Returns NOERROR if successful, an OLE-defined error value otherwise.

*pProp*
    Address of the IShellPropSheetExt interface. In C++, this parameter is implicit.

*lpfnAddPage*
    Address of a function that the property sheet handler calls to add a page to the property sheet. The function takes a property sheet handle returned by the CreatePropertySheetPage function, and the *lParam* parameter passed to the AddPages member function.

*lParam*
    Parameter to pass to function specified by *lpfnAddPage*.

For each page it needs to add to a property sheet, a property sheet handler fills a PROPSHEETPAGE structure, calls CreatePropertySheetPage, and then calls the function specified by *lpfnAddPage*.

IShellPropSheetExt::ReplacePage

```
HRESULT STDMETHODCALLTYPE ReplacePage(IShellPropSheetExt FAR * pProp,
    UINT uPageID, LPFNADDPROPSHEETPAGE lpfnAddPage, LPARAM lParam);
```

Replaces a page in a property sheet for a control panel object

◆ Returns NOERROR if successful, an OLE-defined error value otherwise.

*pProp*
    Address of the IShellPropSheetExt interface. In C++, this parameter is implicit.

*uPageID*
    Identifier of the page to replace. The values for *uPageID* for control panels can be found in the CPLEXT.H header file.

47

*lpfnReplacePage*
    Address of a function that the property sheet handler calls to replace a page to the property sheet. The function takes a property sheet handle returned by the CreatePropertySheetPage function, and the *lParam* parameter passed to the ReplacePage member function.

*lParam*
    Parameter to pass to function specified by *lpfnReplacePage*.

To replace a page, a property sheet handler fills a PROPSHEETPAGE structure, calls CreatePropertySheetPage, and then calls the function specified by *lpfnReplacePage*.

Initialization Interface and Member

IShellExtInit

Interface used to initialize a property sheet extension, context menu extension, or drag-drop handler. The IShellExtInit interface has the following member functions:

Initialize                Initializes the shell extension.

Like all OLE interfaces, IShellExtInit also includes the QueryInterface, AddRef, and Release member functions.

IShellExtInit::Initialize

```
HRESULT STDMETHODCALLTYPE IShellExtInit::Initialize(
    LPSHELLEXTINIT pIface, LPCITEMIDLIST pidlFolder,
    LPDATAOBJECT lpdobj, HKEY hkeyProgID
    );
```

Initializes a property sheet extension, context menu extension, or drag-drop handler.

♦ Returns NOERROR if successful, an OLE-defined error value otherwise.

*pIface*
    Address of the IShellExtInit interface. In C++, this parameter is implicit.

*pidlFolder*
    Address of an ITEMIDLIST structure (item identifier list) that uniquely identifies a folder.

*lpdobj*
    Pointer to an IDataObject interface object that can be used to retrieve the objects being acted upon.

*hkeyProgID*
    Registry key for the file object or folder type.

*48*

This is the first member function the shell calls after it creates an instance of a property sheet extension, context menu extension, or drag-drop handler.

The meanings of some parameters depend on the extension type. For drag-drop handlers, the item identifier list specifies the destination folder (the drop target); the IDataObject interface identifies the items being dropped; and the registry key specifies the file class of the destination folder.

For property sheet extensions and context menu extensions, the item identifier list specifies the folder that contains the selected file objects; the IDataObject interface identifies the selected file objects; and the registry key specifies the file class of the file object that has the focus.

Structures

CMINVOKECOMMANDINFO

```
typedef struct _CMInvokeCommandInfo {
    DWORD   cbSize;         // sizeof(CMINVOKECOMMANDINFO)
    DWORD   fMask;          // see below
    HWND    hwnd;           // see below
    LPCSTR  lpVerb;         // see below
    LPCSTR  lpParameters;   // see below
    LPCSTR  lpDirectory;    // see below
    int     nShow;          // see below
    DWORD   dwHotKey;       // see below
    HANDLE  hIcon;          // see below
} CMINVOKECOMMANDINFO, *LPCMINVOKECOMMANDINFO;
```

Contains information about a context menu command. The address of this structure is passed to the IContextMenu::InvokeCommand member function.

fMask
   Value specifying zero or more of the following flags:

| Value | Meaning |
   |---|---|
   | CMIC_MASK_HOTKEY | Specifies that the dwHotKey member is valid. |
   | CMIC_MASK_ICON | Specifies that the hIcon member is valid. | hwnd
   Handle of the window that owned the context menu, such as the desktop, the explorer, or the tray. An extension might specify this handle as the owner window of any message boxes or dialog boxes it displays.

lpVerb
   32-bit value containing zero in the high-order word and the menu-identifier offset of the command to carry out in the low-order word. The shell specifies this value (using the MAKEINTRESOURCE macro) when the user chooses a menu command.

If the high-order word is *not* zero, this member is the address of a null-terminated string specifying the language-independent name of the command to carry out. This member is typically a string when a command is being invoked programmatically.

lpParameters
: Optional parameters. This member is always NULL for menu items inserted by a shell extension.

lpDirectory
: Optional working directory name. This member is always NULL for menu items inserted by a shell extension.

nShow
: Flag to pass to the ShowWindow function if the command displays a window or launches an application.

dwHotKey
: Optional hot-key to assign any application launched by the command. Ignore this member if the fMask member does not specify CMIC_MASK_HOTKEY.

hIcon
: Icon to use for any application launched by the command. Ignore this member if the fMask member does not specify CMIC_MASK_ICON.

ITEMIDLIST

```
typedef struct _ITEMIDLIST { // idl
    SHITEMID mkid; // list of item identifers
} ITEMIDLIST, * LPITEMIDLIST;
typedef const ITEMIDLIST * LPCITEMIDLIST;
```

Contains a list of item identifiers.

SHITEMID

```
typedef struct _SHITEMID { // mkid
    USHORT cb;       // size of this identifier, including cb itself
    BYTE abID[1];    // variable length item identifier
} SHITEMID, * LPSHITEMID;
typedef const SHITEMID * LPCSHITEMID;
```

Defines an item identifier.

Name-Space Extensions for the Chicago Shell

50

When to Create a Name-Space Extension

Chicago's shell allows applications to extend it's functionality with regular shell extensions (icon handlers, context menu handlers, property sheet handlers, drag drop handlers, data object handlers and copy hook handlers), and with Name-Space Extensions. For more information on the regular shell extensions please read the *"Extending the Chicago Shell"* article. Name-Space Extensions allow applications to expose hierarchical data which may be stored in a file, or anywhere else the Name-Space Extension can access, with the shell's familiar user interface. Files systems, both local and networked, on MS-DOS and Windows NT based systems have hierarchical data. Directories contain files and other directories. End users will use Chicago's shell to access this hierarchical data on a regular basis. If an application has hierarchical data to present to the user, it would reduce training time for the user if the user uses the shell to access this data. A Name-Space Extension extends the shell so that it appears to a user, that the shell understands a hierarchy that is not part of a file system.

In Chicago there are some limitations on Name-Space Extensions. Name-Space Extensions should not be used on arbitrary files found in the file system. This means that you should not implement a Name-Space Extension to expose a hierarchy for a file class where files of the class can be found in many places in the file system. For example a Name-Space Extension should not be used to expose the contents of a compressed file, such as a file compressed with PKZIP. Another example would be using a Name-Space Extension to expose the contexts of a spreadsheet or word processing document in the shell. File viewers, and the applications themselves, should be used to do this. To help enforce this limitation, the shell does not provide a way to register a Name-Space Extension for a file class.

Registering a Name-Space Extension

Name space extensions are tied into the name space 2 ways. One is by adding entries in the registry that place those extensions under the root of the name space "Dekstop" or under "My Computer". File system folders (directories) can be taged as entry points into name space extensions as well.

Registring NSEs in the registry under "Desktop" or "My Computer"

To put an extension under "Desktop" or "My Computer", the handler's CLSID should be registered as a key under either of these two keys.

```
HKEY_LOCAL_MACHINE\Software\Windows\CurrentVersion\Explorer\Desktop\NameSpace
HKEY_LOCAL_MACHINE\Software\Windows\CurrentVersion\Explorer\MyComputer\NameSpace
```

Under arbitrary file system folders.

There are 2 ways to tag a file system folder (directory) as an entry point into a name-space extension. The first is to put the CLSID of the extension on a directory as a file name extension. This method relies on the file system supporting long filenames. The second is mark a directory with the system or read only bits (ATTRIBUTE_READONLY | ATTRIBUTE_SYSTEM), then put a desktop.ini file in that directory that contains the CLSID of the handler. This is less efficient, but works on short name volumes. The two methods are shown below.

```
c:\windows\NSE  (directory marked ATTRIBUTE_SYSTEM or ATTRIBUTE_READONLY)
c:\windows\NSE\desktop.ini
  [.ShellClassInfo]
  CLSID={00000000-1111-2222-3333-444444444444} create a directory that looks like this.
  c:\windows\NSE.{00000000-1111-2222-3333-444444444444}
```

How the shell accesses a Name-Space Extension

When the shell sees that a browser has been registered, it performs the following steps:

1. Gets the Clsid of the handler.
2. Creates an IClassFactory object by calling the DllGetClasObject entry of the specified DLL.
3. Calls IClassFactory::CreateInstance with IID_IPersistFolder to create its instance.
4. Initializes the instance by calling the IPersistFolder:Initialize method.

5. Uses the QueryInterface method to get to the IShellFolder interface.

6. Calls IShellFolder members as appropriate.

The shell displays the first level of the iShellFolder object for the Name-Space Extension, but needs to know how this object should appear. The appearance of the object, both its icon and whether the shell should display a "+" sign on the left of the icon must be described in the registry. For example:

```
HKEY_CLASSES_ROOT
    CLSID
        {00000000-1111-2222-3333-444444444444} = BBS Program
            DefaultIcon = bbsdll.dll,0
            Hierarchical = 1 // 0:no sub-folder, 1:has sub-folder(s)
```

If the extension's name-space is hierarchical (i.e., it has one or more sub folders), the explorer calls IShellFolder members to display the sub folders in the explorers left hand pane, it's content pane. To do the this explorer:

Calls the EnumObjects method to enumerate the sub folders.

Calls the GetDisplaynameOf method to get the names of the sub folders

Calls the GetUIObjectOf method to get the icons for the sub folders

Calls the GetAttributesOf method to know which sub folders have sub folders of their own.

IPersistFolder Interface

```
DECLARE_INTERFACE_(IPersistFolder, IPersist) // fld
{
    // *** IUnknown methods ***
    STDMETHOD(QueryInterface) (THIS_ REFIID riid, LPVOID FAR* ppvObj) PURE;
    STDMETHOD_(ULONG,AddRef) (THIS) PURE;
    STDMETHOD_(ULONG,Release) (THIS) PURE;

// *** IPersist methods ***
    STDMETHOD(GetClassID) (THIS_ LPCLSID lpClassID) PURE;

// *** IPersistFolder methods ***
    STDMETHOD(Initialize) (THIS_
        LPCITEMIDLIST pidl) PURE;
};
```

IDLists

OLE 2.0 introduced objects call *monikers*, which were used to identify and bind references to link sources to the code for reconnection. The Chicago shell provides a similar object called an *ItemID*. ItemIDs are variable-length byte streams that contain information for identifying a file object within a folder. An ItemID does not contain non-persistent values such as pointers to data structures, window handles, or atoms. This is because the shell may store ItemIDs in persistent storage (that is, on disk) and use them later.

An ItemID is defined as follows:

*53*

```
typedef struct _SHITEMID
{
    USHORT  cb;         // Size of the ItemID
    BYTE    abID[1];    // The ItemID (variable length)
} SHITEMID, FAR* LPSHITEMID;

typedef const SHITEMID FAR * LPCSHITEMID;
```

ItemIDs may also contain information that helps improve the efficiency with which you can manipulate the file object, for example, the file object's display name or sorting information.

The shell does not need to know the actual content of an ItemID. The only part of an ItemID the shell uses is the first two bytes, which contain the size of the ItemID. The shell does not look at the rest of the ItemID directly; this information is usable only by the handler that created the ItemID.

The shell often concatenates ItemIDs and adds a NULL terminator at the end, creating an *IDList*. An IDList that contains only one ItemID is called a *simple IDList*, and an IDList that contains multiple ItemIDs is called a *complex IDList*. For consistency, the shell always passes a pointer to an IDList even when the receiving handler can only use a single ItemID. IDLists are defined as follows:

```
typedef struct _ITEMIDLIST    // idl
{
    SHITEMID    mkid;
} ITEMIDLIST, FAR* LPITEMIDLIST;

typedef const ITEMIDLIST FAR* LPCITEMIDLIST;
```

The shell always converts any monikers it receives, for example from the EnumObjects member of an IShellFolder interface, to ItemIDs by calling the interface's IDListFromMoniker member.

In addition to the information to identify a file object, an ITEMID may contain more information that can enhance the efficiency of manipulating the file object. For example the file objects display name or sorting information.

Since the shell knows how to handle ITEMIDs efficiently, shell extensions should return ITEMIDs when someone is enumerating though the handlers objects with the IEnumUnknown::Next() method.

IDMoniker related functions
```
HRESULT WINAPI SHCreateIDMoniker(LPCITEMIDLIST pidl, LPMONIKER FAR* ppmk);
HRESULT SHGetIDFromIDMoniker(LPMONIKER pmk, LPITEMIDLIST FAR* ppidl);
```

IDList related functions
```
BOOL WINAPI SHGetPathFromIDList(LPCITEMIDLIST pidl, LPSTR pszPath);
```

Shell Folder

The IShellFolder interface is derived from OLE's IOleContainer interface. The IOleContainer interface is used to enumerate objects in a container. Similarly the IShellFolder interface is used to enumerate objects within a file object. IShellFolder provides name parsing and enumeration of objects, that is, an outside-in view of the objects within a file object. IOleContainer is itself derived from the IParseDisplayName interface.

54

```
DECLARE_INTERFACE_(IShellFolder, IOleContainer)
{
    // *** IUnknown methods ***
    STDMETHOD(QueryInterface) (THIS_ REFIID riid, LPVOID FAR* ppvObj) PURE;
    STDMETHOD_(ULONG,AddRef) (THIS) PURE;
    STDMETHOD_(ULONG,Release) (THIS) PURE;

// *** IParseDisplayName method ***
    STDMETHOD(ParseDisplayName) (THIS_ LPBC pbc, LPOLESTR lpszDisplayName,
            ULONG FAR* pchEaten, LPMONIKER FAR* ppmkOut) PURE;

// *** IOleContainer methods ***
    STDMETHOD(EnumObjects) ( THIS_ DWORD grfFlags,
                    LPENUMUNKNOWN FAR* ppenumUnknown) PURE;
    STDMETHOD(LockContainer) (THIS_ BOOL fLock) PURE;

// *** IShellFolder methods ***
    STDMETHOD(BindToObject)    (THIS_ LPCITEMIDLIST pidl, LPBC pbc,
            REFIID riid, LPVOID FAR* ppvOut) PURE;
    STDMETHOD(BindToStorage)   (THIS_ LPCITEMIDLIST pidl, LPBC pbc,
            REFIID riid, LPVOID FAR* ppvObj) PURE;
    STDMETHOD(CompareIDs)      (THIS_ LPARAM lParam,
                    LPCITEMIDLIST pidl1, LPCITEMIDLIST pidl2) PURE;
    STDMETHOD(CreateViewObject) (THIS_ HWND hwndOwner, REFIID riid,
                    LPVOID FAR* ppvOut) PURE;
    STDMETHOD(GetAttributesOf)  (THIS_ UINT cidl, LPCITEMIDLIST FAR* apidl,
                    ULONG FAR* rgfInOut) PURE;
    STDMETHOD(GetUIObjectOf)    (THIS_ HWND hwndOwner, UINT cidl,
            LPCITEMIDLIST FAR* apidl,
                    REFIID riid, UINT FAR* prgfInOut, LPVOID FAR* ppvOut) PURE;
    STDMETHOD(GetDisplayNameOf) (THIS_ LPCITEMIDLIST pidl, DWORD uFlags,
                    LPSTRRET lpName) PURE;
    STDMETHOD(SetNameOf)        (THIS_ HWND hwndOwner, LPCITEMIDLIST pidl,
                    LPCOLESTR lpszName, DWORD uFlags,
                    LPITEMIDLIST FAR* ppidlOut) PURE;
    STDMETHOD(MonikerToIDList)  (THIS_ LPMONIKER pmk,
                    LPITEMIDLIST FAR* pidl) PURE;
};
```

IShellFolder EnumObjects

The IOleContainer interface defines a method, EnumObjects, which returns a flag. The shell defines these flags for this method to use:

```
typedef enum tagSHCONTF
{
    SHCONTF_FOLDERS        = 32,  // for shell browser
    SHCONTF_NONFOLDERS     = 64,  // for default view
    SHCONTF_INCLUDEHIDDEN  = 128,     // for hidden/system objects
} SHCONTF;
```

Unique IShellFolder Methods

This interface implements the followings method in addition to the IParseDisplayName and IOleContainer methods.

BindToObject

This function returns an instance of a sub-folder which is specified by the IDList (pidl).

Syntax

```
BindToObject(LPCITEMIDLIST pidl, LPBC pbc, REFIID riid, LPVOID FAR* ppvOut)
```

Parameters pidl  Pointer to an ItemID list.

pbc  Points to the bind context, an instance of the IBindCtx interface, to be used for this binding operation.

riid  Identifies the interface by which the caller wants to connect to the object.

ppvOut  On a successful return, points to the instantiated object, unless BINDFLAGS_JUSTTESTEXISTENCE was specified in the binding options. If BINDFLAGS_JUSTTESTEXISTENCE was specified, NULL can be returned instead.

Example

```
STDMETHODIMP CRegFolder::BindToObject(LPCITEMIDLIST pidl, LPBC pbc,
            REFIID riid, LPVOID FAR* ppvObj)
{
 HRESULT retval;
 CRegFolder* pISF;

retval = E_OUTOFMEMORY;
 pISF = new CRegFolder;
 if(!pISF)
   {
    return(retval);
   }
 if(!pISF->Init())
   {
    return(retval);
   } retval = pISF->QueryInterface(riid, ppvObj);

// Give the new shell folder the same starting point in the shell's namespace
 pISF->m_idl.Copy(m_idl);

CIDList idl((LPITEMIDLIST) pidl);
 if(!pISF->SetRoot(pidl)) return(ResultFromScode(E_OUTOFMEMORY));

return(retval);
}
```

BindToStorage

This function returns a storage instance of a sub-folder, which is specified by the IDList (pidl). The shell never calls this member function in the first release of Chicago.

CompareIDs

This function compares two IDLists and returns the result. The shell always passes 0 as lParam, which indicates "sort by name".

The method should return:

0 (as CODE of the scode), if two IDs indicate the same object.

a negative value if the pidl1 should be placed before pidl2.

a positive value if pidl2 should be placed before pidl1.

Syntax

CompareIDs(LPARAM lParam, LPCITEMIDLIST pidl1, LPCITEMIDLIST pidl2)

Parameters lParam     Indicates how to compare the ids passed. Currently this parameter is always 0, indicating the IDs should be compared by name.

pidl1  A pointer to an Item ID List.

pidl2  A pointer to an Item ID List.

CreateViewObject

This function creates a view object. The shell always passes IID_IShellView as the *riid* parameter. The *hwndOwner* parameter can be used as the owner window of its dialog box or menu during the lifetime of the view object. This member function should always create a new instance which has only one reference count. The shell may create more than one instance of view object from one shell folder object and treat them as separate instances.

Syntax

CreateViewObject(HWND hwndOwner, REFIID riid, LPVOID FAR* ppvOut)

Parameters

| | |
|---|---|
| hwndOwner | A window handle that can be used to own dialog boxes and menus during the life of the view object. |
| riid | Identifies the interface by which the caller wants to connect to the object. |
| ppvOut | On a successful return, points to the instantiated object. |

GetAttributesOf

*57*

This function returns the attributes of specified objects in that folder. The *cidl* and *apidl* parameters specify objects. The *apidl* contains only simple IDLists. The shell initializes *prgfInOut* parameter with a set of flags to be evaluated. The shell folder may optimize the operation by not returning unspecified flags.

Syntax

GetAttributesOf(UINT cidl, LPCITEMIDLIST FAR* apidl,ULONG FAR* rgfInOut)

Parameters cidl apidl prgfInOut

| Flag | Description |
|---|---|
| SFGAO_CANCOPY | Objects can be copied |
| SFGAO_CANMOVE | Objects can be moved |
| SFGAO_CANLINK | Objects can be linked |
| SFGAO_CANRENAME | Objects can be renamed |
| SFGAO_CANDELETE | Objects can be deleted |
| SFGAO_HASPROPSHEET | Objects has property sheets |
| SFGAO_CAPABILITYMASK | ?? |
| SFGAO_LINK | The object is linked |
| SFGAO_SHARE | The object is shared |
| SFGAO_READONLY | The object is read-only |
| SFGAO_DISPLAYATTRMASK | ?? |
| SFGAO_FILESYSANCESTOR | The object contains file system folder |
| SFGAO_FOLDER | The object is a folder. |
| SFGAO_FILESYSTEM (file/folder/root) | The object is a file system thing |
| SFGAO_HASSUBFOLDER | The Object is expandable in the map pane |
| SFGAO_CONTENTSMASK | ?? |

GetUIObjectOf

FIG. 58

This function creates a UI object to be used for specified objects. The shell passes either IID_IDataObject (for transfer operation) or IID_IContextMenu (for context menu operation) as riid.

Syntax

```
GetUIObjectOf(HWND hwndOwner, UINT cidl, LPCITEMIDLIST FAR* apidl, REFIID riid,
UINT FAR* prgfInOut, LPVOID FAR* ppvOut)
```

Parameters hwndOwner cidl apidl riid    Identifies the interface by which the caller wants to connect to the object.

prgfInOut ppvOut

GetDisplayNameOf

This function returns the display name of the specified object. If the ID contains the display name (in the locale character set), it returns the offset to the name. Otherwise, it returns a pointer to the display name string (UNICODE), which is allocated by the task allocator, or fills in a buffer.

Syntax

```
GetDisplayNameOf(LPCITEMIDLIST pidl, LPSTRRET lpName)
```

Parameters pidl    Pointer to an ItemID list.

lpName

SetNameOf

This function sets the display name of the specified object. If it changes the ID as well, it returns the new ID which is allocated by the task allocator.

Syntax

```
SetNameOf(LPCITEMIDLIST pidl, LPCOLESTR lpszName, LPITEMIDLIST pidlOut)
```

Parameters pidl    Pointer to an ItemID list.

lpszName pidlOut

MonikerToIDList

This function creates a corresponding IDList from the specified relative moniker. Typically, it simply calls SHGetIDFromIDMoniker.

Syntax

```
MonikerToIDList(LPMONIKER pmk, LPITEMIDLIST FAR* pidl)
```

Parameters pmk    Pointer to a Moniker.

pidl    Pointer to an ItemID list.

IShellBrowser and IShellView Interfaces

The IShellBrowser and IShellView interfaces handle the displaying of the contents of an IShellFolder object. The shell uses IShellView to handle the right hand pane of the explorer, the contents pane, and IShellBrowser handles the left pane, the explorer pane.

When the user opens a file object that has a browser registered or one its sub-folders, the explorer lets the browser create a view object by calling ther browser's IShellFolder::CreateViewObject member requesting the IShellView interface (it must be a separate instance from IShellFolder instance because the explorer may create more than one view object). Then, the explorer calls IShellView::CreateViewWindow to let the Name-Space Extension create the view window of that folder As one of its parameters, the explorer passes the IShellBrowser interface pointer to the explorer window.

The relationships between IShellBrowser and IShellView interfaces are similar to ones between IOleInPlaceFrame and IOleActiveObject interfaces -- they even have some common members such as InsertMenu() or Translate- Accelerator(). The view object is able to add menu items to the menu bar, add toolbar buttons, display status information on the status bar and/or process short-cut keys.

UI negotiation (menu, toolbar and status bar)

This mechanism is similar to the OLE's in-place activation mechanism, but there are a couple of differences.

First, the view window always exists even though it does not have the input-focus. Therefore, it should maintain three states, deactivated, activated with the focus and activated without the focus. The view window may present different set of menu items depending on the focus state. The explorer notifies the state changes by calling IShellView::UIActivate() member; the view object should call IShellBrowser::OnViewWindowActivate() when the view window is activated by the user (typically by a mouse click).

6C

Second, the explorer does not support layout negotiation. Instead, it allows the view window to add toolbar buttons or set status bar text. The view window may create modeless popups. The view object may call IShellBrowser::GetControlWindow or IShellBrowser::SendControlMsg to control them. The explorer forwards appropriate notification messages from those controls via IShellView::ForwardControlMsg.

Third, the explorer allows the view window to add menu items to the explorer's pull-down menus (in addition to inserting top-level pull-down menus). In other words, the view object is allowed to insert menu items to sub-menus returned from IShellBrowser::InsertMenus(). In order to let the explorer dispatches menu messages correctly, a certain range of menu item IDs (between SHVIEW_FIRST and SHVIEW_LAST) must be used.

Persistent view state

The explorer defines a set of standard view states — view mode (such as "large/small icon view" or "detail view") and view attributes (such as "snap to grid"). The explorer provides a persistent medium to store those states. The view object may or may not use those states but it is recommended to use them, if the view has similar settings. The setting is passed to the view object via IShellView::CreateViewWindow member, and retrieved from it via IShellView::GetCurrentInfo member.

The explorer also provides a persistent medium (a stream) to let the view object store view specific information (such as scroll positions or icon layout). The view object can access this stream by calling IShellBrowser::GetViewStateStream member function.

When the user is browsing from one folder to another, the explorer passes the pointer to the previously viewed IShellView instance as a parameter to IShellView::CreateViewWindow member (before calling its DestroyViewWindow member). This mechanism allows the next view object to retrieve appropriate view state from the previous view object (such as column widths of its details view) via a private interface (typically done by Query Interfacing to a private interface).

IShellView

```
DECLARE_INTERFACE_(IShellView, IOleWindow)
{
    // *** IUnknown methods ***
    STDMETHOD(QueryInterface) (THIS_ REFIID riid, LPVOID FAR* ppvObj) PURE;
    STDMETHOD_(ULONG,AddRef) (THIS) PURE;
    STDMETHOD_(ULONG,Release) (THIS) PURE;

// *** IOleWindow methods ***
    STDMETHOD(GetWindow) (THIS_ HWND FAR* lphwnd) PURE;
    STDMETHOD(ContextSensitiveHelp) (THIS_ BOOL fEnterMode) PURE;

// *** IShellView methods ***
    STDMETHOD(TranslateAccelerator) (THIS_ LPMSG lpmsg) PURE;
    STDMETHOD(EnableModeless) (THIS_ BOOL fEnable) PURE;
    STDMETHOD(UIActivate) (THIS_ UINT uState) PURE;
    STDMETHOD(Refresh) (THIS) PURE;

STDMETHOD(CreateViewWindow)(THIS_ IShellView FAR *lpPrevView,
        LPCFOLDERSETTINGS lpfs, IShellBrowser FAR * psb,
        RECT FAR* prcView, HWND FAR *phWnd) PURE;
    STDMETHOD(DestroyViewWindow)(THIS) PURE;
```

```
..DMETHOD(GetCurrentInfo)(THIS_ LPFOLDERSETTINGS lpfs) PURE;
STDMETHOD(ForwardControlMsg)(THIS_ UINT id, UINT uMsg, WPARAM wParam,
lParam,
        LRESULT FAR* p  et) PURE;
STDMETHOD(AddPropertySheetPages)(THIS_ DWORD dwReserved,
                            LPFNADDPROPSHEETPAGE lpfn, LPARAM lparam) PURE;
STDMETHOD(SaveViewState)(THIS) PURE;
STDMETHOD(SelectItem)(THIS_ LPCVOID lpvID, UINT uFlags) PURE;
};
```

Unique IShellView Methods

TranslateAccelerator

Similar to IOleInPlaceActiveObject::TranslateAccelerator. The explorer calls this function BEFORE any other translation. Returning S_OK indicates that the message was translated (eaten) and should not be translated or dispatched by the explorer.

Syntax

```
STDMETHOD(TranslateAccelerator) (THIS_ LPMSG lpmsg) PURE;
```

Parameters lpmsg          Points to an MSG structure containing the keystroke message.

EnableModeless

Similar to IOleInPlaceActiveObject::EnableModeless.

Syntax

```
STDMETHOD(EnableModeless) (THIS_ BOOL fEnable) PURE;
```

Parameters fEnable

UIActivate

The explorer calls this member function whenever the activation state of the view window is changed by a certain event that is NOT caused by the shell view itself. The SVUIA_DEACTIVATE will be passed when the explorer is about to destroy the shell view window; the shell view is supposed to remove all the UIs (typically merged menu and modeless popup windows). The SVUIA_ACTIVATE_NOFOCUS will be passed when the shell view is losing the input focus or the shell view has been just created without the input focus; the shell view is supposed to set menu items appropriate for non-focused state.

The SVUIA_ACTIVATE_FOCUS will be passed when the explorer has just created the view window with the input focus; the shell view is supposed to set menu items appropriate for focused state. The shell view should not change focus within this member function.

The shell view should not hook the WM_KILLFOCUS message to remerge menu items. However, the shell view typically hook the WM_SETFOCUS message, and re-merge the menu after calling IShellBrowser::OnViewWindowActivated.

Syntax

```
STDMETHOD(UIActivate) (THIS_ UINT uState) PURE;
```

Parameters uState uState values for IShellView::UIActivate

```
typedef enum {

SVUIA_DEACTIVATE      = 0,

SVUIA_ACTIVATE_NOFOCUS = 1,

SVUIA_ACTIVATE_FOCUS  = 2

} SVUIA_STATUS;
```

SaveViewState

The explorer calls this member when the shell view is supposed to store its view settings. The shell view is supposed to get a view stream by calling IShellBrowser::GetViewStateStream and store the current view state into the stream.

Syntax

```
STDMETHOD(SaveViewState)(THIS) PURE;
```

SelectItem

The explorer calls this member to change the selection state of object(s) within the shell view.

Syntax

```
STDMETHOD(SelectItem)(THIS_ LPCVOID lpvID, UINT uFlags) PURE;
```

Parameters lpvID uFlags
```
// shellview select item flags
```

63

```
#define SVSI_DESELECT      0x0000
#define SVSI_SELECT        0x0001
#define SVSI_EDIT          0x0003  // includes select
#define SVSI_DESELECTOTHERS 0x0004
#define SVSI_ENSUREVISIBLE 0x0008
```

Shell Browser

IShellBrowser interface is the interface that is provided by the shell explorer/folder frame window. When it creates the "contents pane" of a shell folder (which provides IShellFolder interface), it calls its CreateViewObject member function to create an IShellView object. Then, it calls its CreateViewWindow member to create the "contents pane" window. The pointer to the IShellBrowser interface is passed to the IShellView object as a parameter to this CreateViewWindow member function call

```
DECLARE_INTERFACE_(IShellBrowser, IOleWindow)
{
    // *** IUnknown methods ***
    STDMETHOD(QueryInterface) (THIS_ REFIID riid, LPVOID FAR* ppvObj) PURE;
    STDMETHOD_(ULONG,AddRef) (THIS) PURE;
    STDMETHOD_(ULONG,Release) (THIS) PURE;

// *** IOleWindow methods ***
    STDMETHOD(GetWindow) (THIS_ HWND FAR* lphwnd) PURE;
    STDMETHOD(ContextSensitiveHelp) (THIS_ BOOL fEnterMode) PURE;

// *** IShellBrowser methods *** (same as IOleInPlaceFrame)
    STDMETHOD(InsertMenus) (THIS_ HMENU hmenuShared, LPOLEMENUGROUPWIDTHS lpMenuWidths) PURE;
    STDMETHOD(SetMenu) (THIS_ HMENU hmenuShared, HOLEMENU holemenu, HWND hwndActiveObject) PURE;
    STDMETHOD(RemoveMenus) (THIS_ HMENU hmenuShared) PURE;
    STDMETHOD(SetStatusText) (THIS_ LPCOLESTR lpszStatusText) PURE;
    STDMETHOD(EnableModeless) (THIS_ BOOL fEnable) PURE;
    STDMETHOD(TranslateAccelerator) (THIS_ LPMSG lpmsg, WORD wID) PURE;

// *** IShellBrowser methods ***
    STDMETHOD(BrowseObject) (THIS_ LPMONIKER pmk, UINT wFlags) PURE;
    STDMETHOD(GetViewStateStream) (THIS_ DWORD grfMode, LPSTREAM FAR *ppStrm) PURE;
    STDMETHOD(GetControlWindow)(THIS_ UINT id, HWND FAR* lphwnd) PURE;
    STDMETHOD(SendControlMsg)(THIS_ UINT id, UINT uMsg, WPARAM wParam, LPARAM lParam, LRESULT FAR* pret) PURE;
    STDMETHOD(QueryActiveShellView)(THIS_ struct IShellView FAR** ppshv) PURE;
    STDMETHOD(OnViewWindowActive)(THIS_ struct IShellView FAR* ppshv) PURE;
    STDMETHOD(AddViewPropertySheetPages)(THIS_ DWORD dwReserved,
                     LPFNADDPROPSHEETPAGE lpfn, LPARAM lparam) PURE;
    STDMETHOD(SetToolbarItems)(THIS_ LPTBBUTTON lpButtons, UINT nButtons, UINT uFlags) PURE;
};
```

IShellBrowser Methods

64

GetWindow

Inherited from IOleWindow::GetWindow.

Syntax

```
GetWindow(HWND FAR* lphwnd)
```

Parameters phwnd

Values for phwnd parameter of GetWindow/GetWindowRect member function.

FCW_STATUS

FCW_TOOLBAR

FCW_TREE

FCW_VIEW

FCW_BROWSER

FCW_TABS

ContextSensitiveHelp

Inherited from IOleWindow::ContextSensitiveHelp.

Syntax

```
ContextSensitiveHelp(BOOL fEnterMode)
```

Parameters fEnterMode

InsertMenus

Similar to the IOleInPlaceFrame::InsertMenus. The explorer will put "File" and "Edit" pull down in the File menu group, "View" and "Tools" in the Container menu group and "Help" in the Window menu group. Each pull down menu will have a unique ID, FCIDM_MENU_FILE/EDIT/VIEW/TOOLS/HELP. The view is allowed to insert menu items into those sub-menus by those IDs must be between FCIDM_SHVIEWFIRST and FCIDM_SHVIEWLAST.

Syntax

```
InsertMenus(HMENU hmenuShared, LPOLEMENUGROUPWIDTHS lpMenuWidths)
```

Parameters hmenuShared lpMenuWidths

SetMenu

Similar to the IOleInPlaceFrame::SetMenu. The explorer ignores the holemenu parameter and performs menu-dispatch based on the menu item IDs. It is important to note that the explorer will add different set of menu items depending on whether the view has a focus or not. Therefore, it is very important to call OnViewActivate whenever the view window (or its children) gets the focus.

Syntax

```
SetMenu(HMENU hmenuShared, HOLEMENU holemenu, HWND hwndActiveObject)
```

Parameters hmenuShared holemenu hwndActiveObject

RemoveMenus

Same as the IOleInPlaceFrame::RemoveMenus.

Syntax

```
RemoveMenus(HMENU hmenuShared)
```

Parameters hmenuShared

SetStatusText

Same as the IOleInPlaceFrame::SetStatusText. It is also possible to send messages directly to the status window via SendControlMsg.

Syntax

```
SetStatusText(LPCOLESTR lpszStatusText) SetStatusText(lpszStatusText)
```

Parameters lpszStatusText

EnableModeless

Same as the IOleInPlaceFrame::EnableModeless.

Syntax

```
EnableModeless(BOOL fEnable)
```

Parameters fEnable

TranslateAccelerator

Same as the IOleInPlaceFrame::TranslateAccelerator, but will be never called because Chicago does support executables in this context. This member function is defined here for possible future enhancement.

BrowseObject

The view calls this member to let shell explorer browse to another folder. "pmk" is an absolute moniker (from the desktop), which specifies the folder to be browsed.

Syntax

```
BrowseObject( LPMONIKER pmk, UINT wFlags)
```

Parameters pmk    Pointer to a moniker that specifies the folder to be browsed.

wFlags      Not Used

GetViewStateStream

The browser returns an IStream interface for the view state information. "grfMode" specifies the read/write access (STGM_READ, STGM_WRITE or STGM_READWRITE). Note that it might return NULL in *ppstm, which means no need to save/read view information.

Syntax

```
GetViewStateStream( DWORD grfMode, LPSTREAM FAR *ppStrm)
```

Parameters grfMode ppstm

67

SendControlMsg

The shell view calls this member function to send control messages to one of Explorer controls (toolbar or status window – FCW_TOOLBAR or FCW_STATUS).

Syntax

```
SendControlMsg( UINT id, UINT uMsg, WPARAM wParam,
                LPARAM lParam, LRESULT FAR* pret)
```

Parameters id uMsg wParam lParam pret

QueryActiveShellView

This member returns currently activated (displayed) shellview object. A shellview never need to call this member function.

Syntax

```
QueryActiveShellView( struct IShellView FAR** ppshv)
```

Parameters pshv Pointer to an IShellView interface.

OnViewWindowActive

The shell view window calls this member function when the view window (or one of its children) got the focus. It MUST call this member before calling IShellBrowser::InsertMenus, because it will insert different set of menu items depending on whether the view has the focus or not.

Syntax

```
OnViewWindowActive( struct IShellView FAR* ppshv)
```

Parameters pshv Pointer to an IShellView interface.

AddViewPropertySheetPages

68

Not used in Chicago.

SetToolbarItems

The view calls this function to add toolbar items to the explorer's toolbar.

Syntax

SetToolbarItems( LPTBBUTTON lpButtons, UINT nButtons, UINT uFlags)

Parameters

- lpButtons     Pointer to an array of toolbar buttons.
- nButtons     The number of buttons pointed to by lpButtons
- uFlags     FCT_MERGE
  FCT_CONFIGABLE
  FCT_ADDTOEND

Some Housekeeping Stuff

Task Allocator

When a shell extension handler needs to allocate memory that will later be freed by the shell, the extension must use shell's task allocator APIs. To get an IMalloc to free shell returned memory, use the following. The gaurentees compatibility with extensions that use OLE and run under the debug memory allocator that OLE provides.

- HRESULT WINAPI SHGetMalloc(IMalloc *);

The embodiments of the invention in which an exclusive property or privilege is claimed are defined as follows:

1. A method of generating a property sheet having at least a shell supported property sheet page and at least an application supported property sheet page in a data processing system having a video display and a processor running an operating system that includes a shell, the method comprising:

providing at least one object associated with an application installed under the operating system, each object belonging to an object class;

providing a shell supported property sheet page defined by the shell in association with the object class, the shell supported property sheet page presenting a shell supported property;

providing at least one application supported property sheet page defined by the application in association with the object, the application supported property sheet page presenting at least one application supported property;

integrating the application supported property sheet page and the shell supported property sheet page into the property sheet; and in response to a request to display one or more properties associated with the object, displaying the property sheet to provide access to the shell supported property sheet page and the application supported property sheet page.

2. The method according to claim 1 wherein the operation of providing at least one application supported property sheet page comprises:

receiving the application supported property associated with the object; and generating the application supported property sheet page to present the application supported property.

3. The method according to claim 1 wherein the operation of providing at least one application supported property sheet page comprises:

providing a property sheet handler for each application supported property sheet page associated with the object, the property sheet handler being provided by the application program.

4. The method according to claim 3 wherein the operation of providing an application supported property sheet page comprises:

registering the property sheet handler in the registry, the property sheet handler remaining independent of the operating system.

5. The method of claim 3 wherein the integrating operation comprises:

invoking the property sheet handler to retrieve the application supported property sheet page for integration into the property sheet.

6. The method according to claim 3 wherein the shell supported property sheet page is associated with the property sheet, and the integrating operation comprises:

obtaining a class identifier for the property sheet handler;

creating an instance of the property sheet handler, based on the class identifier;

defining an interface for adding the application supported property sheet page to the property sheet, based on the instance of the property sheet handler; and adding the application supported property sheet page to the property sheet, through the interface.

7. A computer-readable medium containing instructions for carrying out the method in any one of claims 1–6.

8. A computer-readable medium as recited in claim 7 wherein the computer-readable medium is a communications medium.

* * * * *

UNITED STATES PATENT AND TRADEMARK OFFICE
CERTIFICATE OF CORRECTION

PATENT NO.    : 6,437,810 B1
DATED         : August 20, 2002
INVENTOR(S)   : S. Nakajima et al.

It is certified that error appears in the above-identified patent and that said Letters Patent is hereby corrected as shown below:

Column 1,
Line 51, "type. in" should read -- type in --

Column 2,
Line 9, "database is. accessed" should read -- database is accessed --
Line 10, "context. menu" should read -- context menu --
Line 24, "arid," should read -- and, --
Line 32, "processing. system" should read -- processing system --

Column 3,
Line 38, "an application," should read -- an application --

Column 4,
Line 24, "an, instance" should read -- an instance --
Line 29, "present invention" should read -- present invention; --
Line 32, "inventions," should read -- invention; --

Column 5,
Line 41, "extension," should read -- extension --

Column 6,
Line 3, "HKEY$_{CLASSES}$_ROOT." should read -- HKEY_CLASSES_ROOT. --
Line 13, "that. holds" should read -- that holds --
Line 29, "implemented," should read -- implemented --
Line 36, "Awordprocessor" should read -- A Wordprocessor --
Line 38, (Table item 3), indent the line beginning "shell"
Line 39, (Table item 4), indent the line beginning "open"
Line 40, (Table item 5), double indent the line beginning "command"
Line 41, (Table item 6), indent the line beginning "print"
Line 42, (Table item 7), double indent the line beginning "command"
Line 43, (Table item 8), indent the line beginning "printTo"
Line 43, (Table item 9), double indent the line beginning "command"
Line 43, (Table item 9), "/p" should read -- /pt --
Line 44, (Table item 10), indent the line beginning "preview"
Line 46, (Table item 11), double indent the line beginning "command"
Line 48, (Table item 13), indent the line beginning "ContexMenuHandlers"
Line 48, (Table item 13), "ContexMenuHandlers" should read
-- ContextMenuHandlers --
Line 49, (Table item 14), double indent the line beginning "ExtraMenu"

UNITED STATES PATENT AND TRADEMARK OFFICE
CERTIFICATE OF CORRECTION

PATENT NO.    : 6,437,810 B1
DATED         : August 20, 2002
INVENTOR(S)   : S. Nakajima et al.

It is certified that error appears in the above-identified patent and that said Letters Patent is hereby corrected as shown below:

Column 6, (continued)
Line 49, (Table item 14), "(00000000-1111-2222-3333-00000000000001)" should read
-- {00000000-1111-2222-3333-00000000000001} --
Line 50, (Table item 15), single indent the line beginning "PropertysheetHandlers"
Line 50, (Table item 15), "PropertysheetHandlers" should read
-- PropertySheetHandlers --
Line 51, (Table item 16), double indent the line beginning "SummaryInfo"
Line 51, (Table item 16), "(00000000-1111-2222-3333-00000000000001)" should read
-- {00000000-1111-2222-3333-00000000000002} --
Line 52, (Table item 17), single indent the line beginning "IconHandler"
Line 52, (Table item 17), "(00000000-1111-2222-3333-00000000000001)"should read
-- {00000000-1111-2222-3333-00000000000003} --
Line 54, "discussed. in" should read -- discussed in --

Column 7,
Line 52, "factory. is" should read -- factory is --
Lines 55-56, "CreateInstance(
          )" should not break
Line 61, "After tile" should read -- After the --

Column 8,
Line 21, "#undef" should read -- # undef --
Line 25, "(" should read -- { --
Line 29, double indent "PURE;"
Line 36, ")" should read -- } --
Line 50, "(" should read -- { --
Line 53, "LPVOID*ppvObj,)" should read -- LPVOID*ppvObj) --

Column 9,
Line 3, ");" should read -- }; --
Line 12, "specificd" should read -- specified --
Line 50-51, " "Properties…
          " " should not break

UNITED STATES PATENT AND TRADEMARK OFFICE
CERTIFICATE OF CORRECTION

PATENT NO. : 6,437,810 B1
DATED : August 20, 2002
INVENTOR(S) : S. Nakajima et al.

It is certified that error appears in the above-identified patent and that said Letters Patent is hereby corrected as shown below:

Column 10,
Line 6, "(" should read -- { --
Line 17, after "PURE;" subindent and insert -- } --
Line 18, indent the paragraph beginning "The IShellPropSheetExt"
Line 42, "provided the icon" should read -- provided by the icon --
Line 51, "(" should read -- { --

Column 11,
Line 3, "};" should read -- }; --
Line 9, "function called" should read -- function is called --
Line 32, "(" should read -- { --
Line 43, "};" should read -- }; --
Line 58, "printer. object" should read -- printer object --

Column 13,
Line 50, "(" should read -- { --
Line 61, "};" should read -- }; --
Line 62, indent the paragraph beginning "The IPersistFolder"

Column 14,
Line 7, "(" should read -- { --
Line 45, "};" should read -- }; --
Line 53, "fiction" should read -- function --
Line 57, "(" should read -- { --

Column 15,
Line 24, "uflags)" should read -- uFlags) --
Line 24, "};" should read -- }; --
Line 34, "DECLARE INTERFACE (IShellBrowser," should read
-- DECLARE_INTERFACE_(IShellBrowser, --
Line 35, "(" should read -- { --
Line 39, "STDMETHOD (ULONG," should read -- STDMETHOD_(ULONG, --
Line 48, "LPbLEMENUGROUPWIDTHS" should read
-- LPOLEMENUGROUPWIDTHS --

UNITED STATES PATENT AND TRADEMARK OFFICE
CERTIFICATE OF CORRECTION

PATENT NO.     : 6,437,810 B1
DATED          : August 20, 2002
INVENTOR(S)    : S. Nakajima et al.

It is certified that error appears in the above-identified patent and that said Letters Patent is hereby corrected as shown below:

Column 16,
Line 14, "};" should read -- }; --
Line 36, "134 Tile" should read -- 134. The --

Signed and Sealed this

Twenty-second Day of July, 2003

JAMES E. ROGAN
*Director of the United States Patent and Trademark Office*